(12) United States Patent
Kawamura

(10) Patent No.: US 6,700,242 B2
(45) Date of Patent: Mar. 2, 2004

(54) MAGNETIC FLUX CONTROLS FOR PERMANENT-MAGNET MOTOR-GENERATOR

(76) Inventor: Hideo Kawamura, 13-5, Okada 8-chome, Samukawa-machi, Kouza-gun, Kanagawa-ken 253-0105 (JP)

( * ) Notice: Subject to any disclaimer, the term of this patent is extended or adjusted under 35 U.S.C. 154(b) by 179 days.

(21) Appl. No.: 09/925,703

(22) Filed: Aug. 10, 2001

(65) Prior Publication Data

US 2002/0084705 A1 Jul. 4, 2002

(30) Foreign Application Priority Data

| Dec. 28, 2000 | (JP) | 2000-402004 |
| Jan. 9, 2001 | (JP) | 2001-001053 |
| Mar. 16, 2001 | (JP) | 2001-075438 |
| May 14, 2001 | (JP) | 2001-142630 |

(51) Int. Cl.[7] .......... H02K 1/16; H02K 3/487; H02K 7/116; H02K 21/14; H02K 9/30
(52) U.S. Cl. .......... 310/68 R; 310/2.54; 310/191
(58) Field of Search .......... 310/254, 112, 310/113, 114, 179, 184, 190, 191, 186, 168, 68 B, 68 R

(56) References Cited

U.S. PATENT DOCUMENTS

| 3,590,293 A | * | 6/1971 | Susdorf | 310/94 |
| 3,731,127 A | * | 5/1973 | Harrington | 310/254 |
| 5,015,905 A | * | 5/1991 | Koharagi et al. | 310/186 |
| 5,369,322 A | * | 11/1994 | Maruyama et al. | 310/39 |
| 5,471,106 A | * | 11/1995 | Curtis et al. | 310/90.5 |
| 5,691,591 A | * | 11/1997 | McCann | 310/198 |

FOREIGN PATENT DOCUMENTS

| JP | 23626071995 A | 9/1995 |
| JP | 26198872000 A | 9/2000 |

* cited by examiner

*Primary Examiner*—Tran Nguyen
(74) *Attorney, Agent, or Firm*—Browdy and Neimark, P.L.L.C.

(57) ABSTRACT

A magnetic flux control means for a motor-generator, in which an annular member regulates the magnetic flux while the on-off operation of a switching means provides more than one constant voltage depending on the rpm of the rotor. A stator contains high-tension windings, low-tension windings and variable-voltage windings. A controller conducts the switching operation among the windings to produce any desired voltage of, for example a high-tension of 100V, a low-tension of 27V for automotive electrical equipment and a variable voltage for control of an actuator. The annular member may be arranged for angular movement with respect to the stator, either outside or inside the stator.

40 Claims, 24 Drawing Sheets

(I)

(II)

MAGNETIC FLUX CONTROLS FOR PERMANENT-MAGNET MOTOR-GENERATOR

BACKGROUND OF THE INVENTION

1. Field of the Invention

The present invention relates to magnetic flux control means for a permanent-magnet motor-generator that is comprised of a rotor of permanent-magnet pieces supported for rotation in a stator housing, and a stator surrounding around an outside periphery of the rotor.

2. Description of the Prior Art

Modern advanced permanent magnets of high performance have become much employed on a rotor of a motor-generator. Moreover, as the motor-generator having the rotor structure of permanent magnets is high in efficiency of electromechanical energy conversion and simple in construction, its use has recently grown in industrial machines and instruments of various kinds. Then, much research and development have continued to make the motor-generator compact or slim in construction, with even high performance and high power output, and correspondingly necessitated a growing variety of parts and components. In order to increase a torque at low speed in operation of the conventional motor-generators, it is effective to increase the strength of the magnetic field of the stator around the rotor, thereby raising the torque. With the motor-generators, thus, increasing well the torque causes the increase of electromotive force at a low speed, contributing to the provision of commercially viable power source for machines.

Among the conventional a-c motor-generators capable of developing high-power output, there is a motor-generator disclosed in Japanese Patent Laid-Open No. 236260/1995, which is co-pending application of the present inventor. The prior motor-generator controls magnetic flux density in proportion to the speed in revolutions per minute (rpm) of the rotor to adjust properly an amount of the generated amperes or voltages. To cope with this, a control ring is arranged between the rotor and the stator for rotation relatively of them and further a magnetic flux permeable member is provided in the control ring.

Further disclosed in Japanese Patent Laid-Open No. 261988/2000, which is also co-pending application of the present inventor, is a motor-generator in which a cylindrical controller member is arranged on the inside surface of the stator, the cylindrical controller member being formed of magnetic permeable pieces and non-permeable pieces, which alternate in position circularly in the form of a cylinder. The cylindrical controller member is moved selectively to any angular position relatively to the stator in accordance with an operating phase of the motor-generator. That is to say, to get it started, the cylindrical controller member is moved to an angular position where the magnetic flux permeable pieces of the controller member are brought into radial alignment with the teeth of the stator, each to each tooth. In contrast, when the rotor comes to rest, the cylindrical controller member is moved to another angular position where the magnetic flux permeable pieces may be cooperative with the teeth of the stator core to provide the magnetic path around the overall circumference of the controller member, thus allowing the magnetic flux to pass circumferentially of the controller member with a uniform distribution, thereby ensuring smooth rotation of the rotor.

In conventional motor-generators, there is a way in which the on-off switch operation of a power transistor chops the generated power to produce a chopped voltage. However, this way has a major problem of causing a high ripple voltage, which makes it tough to control the generated power. With the prior motor-generator disclosed in the senior application stated earlier, there is provided an annular member composed of magnetic flux permeable pieces arranged circularly at a pitch equal to a stator tooth pitch, with resinous pieces being each interposed between any adjoining magnetic flux permeable pieces so as to match the stator slots. The annular member is installed around the rotor for angular movement relatively to the stator. At low speed in rpm the annular member is moved to an angular position where the magnetic flux permeable pieces come in radial alignment with the stator teeth. In contrast, when the rotor is driven at a high speed, the annular member is shifted to another angular position where the magnetic flux permeable pieces are each displaced out of the alignment with the associated stator tooth to reduce an area allowing the magnetic flux to pass through there. With the construction in which the magnetic flux permeable pieces are arranged intermittently and jointed together with resinous pieces to form a cylinder, the resinous pieces are much subjected to wear during revolution of the rotor. Moreover, the annular member, since being subject to restoring force, experiences a large force rendering magnetism much more when the magnetic path is reduced. This makes a troublesome problem of causing deformation of the annular member, which might lead to breakage of the annular member.

In conventional motor-generators, there is a way in which the on-off switch operation of a power transistor chops the generated power to produce a chopped voltage. However, this way has a major problem of causing a high ripple voltage, which makes it tough to control the generated power. With the prior motor-generator disclosed in the senior application stated earlier, there is provided an annular member composed of permeable pieces arranged circularly at a pitch equal to a stator tooth pitch, with resinous pieces being each interposed between any adjoining permeable pieces so as to match the stator slots. The annular member is installed around the rotor for angular movement relatively to the stator. At low speed in rpm the annular member is moved to an angular position where the permeable pieces come in radial alignment with the stator teeth. In contrast, when the rotor is driven at a high speed, the annular member is shifted to another angular position where the permeable pieces are each displaced out of the alignment with the associated stator tooth to reduce an area allowing the magnetic flux to pass through there. With the construction in which the permeable pieces are arranged intermittently and jointed together with resinous pieces to form a cylinder, the resinous pieces are much subjected to wear during revolution of the rotor. Moreover, the annular member, since being subject to restoring force, experiences a large force rendering magnetism much more when the magnetic path is reduced. This makes a troublesome problem of causing deformation of the annular member, which might lead to breakage of the annular member.

The permanent-magnet generators need exploiting the greatest possible magnetic force inherent to the permanent magnets while reducing the magnetic force as the speed in rpm of the rotor increases. To cope with this, it is conceivable to provide a generator in which more than one winding is wound in phase on the stator core in a manner to increase the voltage as the rpm rises. According to the generator constructed as stated just above, the production of a desired constant voltage will be realized easily by a way of controlling the magnetic flux passing through the stator in light of an electric current induced in the windings.

The output (U) of the permanent-magnet motor-generator is determined, depending on the magnitude of magnetic force of the permanent magnet, the number of loops or turns of the stator windings and the speed in rpm of the rotor, and is given mathematically by $$U = 3^{1/2} \cdot (2\pi f/2^{1/2}) \cdot \phi w_1 \cdot k w_1$$

where f is the frequency, $\phi$ is the magnetic flux density, $w_1$ the number of turns and $kw_1$ a factor. Here the magnetic flux density is determined in terms of the relation between the magnetic force and magnetic resistance of the permanent magnet, and written in $\phi = Ni/Rm$, where Ni is the magnetomotive force and Rm is the magnetic resistance.

The magnetic resistance is equal to the magnetomotive force divided by the magnetic flux, or $Rm = L_1/(\mu \cdot S_1)$, where $L_1$ is a distance, $S_1$ is an area and $\mu$ is any relative permeability of any material determined on the basis of the permeability of air.

Moreover, the permanent-magnet motor-generators may produce the high output. Since they do not, however, contain any means for controlling the magnetic flux when the rotor is driven at high rpm, they are difficult of control of the generated power. With the motor-generator serving as a motor, especially, an electrical potential has to be applied against the generated high voltage, otherwise it is quite hard to produce any high voltage.

A prior approach to the resolution of the problem as stated just above is the permanent-magnet generator disclosed in Japanese Patent Laid-Open No. 261988/2000 recited earlier. With the prior generator, since the magnetic flux permeable pieces are arranged intermittently and jointed together with resinous pieces to form the annular member, the resinous pieces are much subjected to wear during revolution of the rotor. Moreover, the annular member, since being subject to restoring force, experiences a large force rendering magnetism much more when the magnetic path is reduced. This makes a troublesome problem of causing deformation of the annular member, which might lead to breakage of the annular member.

Another problem faced in the motor-generator resides in the magnetic path, more particular, the air gap between the rotor and the stator. The permeability of air is $4\pi \times 10^{-7}$ (H□m), whereas the permeability of silicon steel containing 3% Si is thirty thousand times that of air and the permeability of PC nickel-iron alloys is fifty thousand times that of air. That is, both the alloys have extraordinary high magnetic permeability as compared with air. It will be thus appreciated that any cylindrical member for controlling magnetic flux, arranged around the outside periphery of the rotor for angular movement relatively to the stator with keeping either close contact with or any infinitesimal clearance spaced apart from the tooth tips of stator teeth, may help ensure a magnetic path well in efficiency of the motor-generator. Nevertheless, the cylindrical member recited just above, as constructed in a structure that magnetic flux permeable pieces and nonmagnetic pieces alternate circularly with each other, has a disadvantage that the magnetic flux density is too restricted at an area where any magnetic flux permeable piece intersects any nonmagnetic piece, thereby rendering the magnetic field entering the stator too small.

Even if it were allowed, in light to air less in permeability, to form the stator itself in a construction making it possible to restrict the flow of flux passing through the stator core, the magnetic flux density passing through the stator would be well controlled with no provision of the conventional magnetic-flux control means such as the cylindrical member for control of the magnetic flux, which is composed of the magnetic flux permeable pieces combined with the nonmagnetic pieces and arranged between the stator and the rotor revolving at high speed in rpm. This concept to form the stator itself in a construction making it possible to restrict the flux passing through the stator core posses no problem of encountering wear of the magnetic flux permeable and nonmagnetic pieces in the cylindrical member for control of the magnetic flux and also occurrence of accidental collision of the cylindrical member with the revolving rotor. Moreover, there is no fear of cracking and/or breakage at an interface between any adjacent magnetic flux permeable and nonmagnetic pieces, which might occur due to difference in linear expansion coefficient, hardness and so on between materials of the magnetic flux permeable and nonmagnetic pieces.

After having evaluated the design considerations of the permanent-magnet motor-generator on the basis of the equations recited earlier, it has become evident that the magnetic flux is dominantly controlled by the influence of the air gap on the magnitude of magnetic force because air is extremely large in magnetic resistance. For example, with the motor-generator of 60 mm long having a rotor of about 60 mm in diameter with an air gap of about 1.5 mm being provided between the confronting stator and rotor, the magnetic resistance of the air gap is $3.33 \times 10^6$ while the magnetic resistance of the rotor is $2.1 \times 10^3$. Thus, it will be understood that the air is fifteen hundred times larger in magnetic resistance than the rotor. No simple means for controlling the magnetic flux density has been devised heretofore for the motor-generator having the characteristics recited above.

However, even the motor-generator having the magnetic flux permeable member made extremely small in area contains still a drawback to be resolved, in which it does not control positively the inferior permeability, or nonmagnetic property of air. Moreover, as opposed to the motor-generator of the type having the generation characteristics in which the voltage rises in proportion to the increase of rpm, the motor-generator of the type stated earlier will be reduced in the rate of voltage rise. Nevertheless, the decrease in the rate of voltage rise is too slow to always meet the desired characteristics.

SUMMARY OF THE INVENTION

It is a primary object of the present invention to overcome the problems stated earlier and to provide magnetic flux control means for a motor-generator, in which switching means change over connections among high-tension windings, low-tension windings and variable-voltage windings to produce any desired voltage, and an annular member installed between a stator and a rotor is angularly moved in such a manner that a strength of magnetic flux decreases to depress occurrence of a reaction force as a speed in rpm rises, while the strength of magnetic flux at a low speed in rpm is realized by a magnetic force intrinsic to a permanent magnet, thereby helping ensure generating always a desired constant voltage independently of any variation in rpm of the rotor.

With the magnetic flux control means according to the present, moreover, there is provided an annular member of a simple construction in which magnetic permeable pieces and nonmagnetic pieces are arranged alternately to form a cylinder and joined together to ensure steady mechanical strength of the annular member, the magnetic flux permeable pieces being chamfered at corners on a radially outside circumference of the annular member. The annular member may be moved angularly in a steady sliding manner in response to the variation in rpm to control properly the magnetic flux, thereby ensuring always the desired constant voltage.

As an alternative, there is provided the magnetic flux control means in which a stator core is made slim in radial thickness of an outside circumferential magnetic path and a cylindrical member fits over the outside circumferential magnetic path for angular movement relative to the stator core, the cylindrical member being provided on an inside surface thereof with a series of axial grooves in which air exists instead of nonmagnetic material. Sliding rotation of the cylindrical member around the stator core results in controlling the magnetic flux.

Besides, the magnetic flux control means in which the magnetic permeable pieces and nonmagnetic pieces alternate circularly to form a cylinder is designed so as to keep the annular member against uneven wear, preventing the outside surface of the annular member from interfering with the tooth tips inside the stator core, thus ensuring the secure sliding rotation of the annular member to control the magnetic flux.

The present invention is concerned with a magnetic flux control means for a permanent-magnet motor-generator, comprising a rotor supported for rotation in a stator housing and composed of more than one permanent-magnet piece arranged circumferentially in a way spaced apart from each other, a stator fixed to the stator housing to surround around an outside periphery of the rotor and composed of a stator core with teeth providing sequential slots, and windings laid in the slots, an annular member arranged in close contact with the stator for angular movement with keeping sliding contact with the stator, a driving means to move the annular member with respect to the stator, and a controller for energizing the driving means in response to rpm of the rotor to control a position of the annular member relatively to the stator, thereby regulating a magnetic flux density in the teeth of the stator to give a preselected desired voltage.

In an aspect of the present invention, a magnetic flux control means for a motor-generator is disclosed, in which the annular member is arranged inside the stator and comprised of a magnetic flux permeable piece less in width than the slot defined between any two adjacent teeth in the stator core, and a nonmagnetic piece interposed between any two adjacent magnetic flux permeable pieces, and in which the windings laid in the stator are composed of a high-tension winding of more than one winding set for a power source, a low-tension winding of more than one winding set and a voltage-variable winding of at least one winding set for voltage control while the controller serves for controlling on-off operation of a switching means to change over connections among the winding sets, thereby varying a number of turns of the high-tension winding and the low-tension winding.

In another aspect of the present invention, a magnetic flux control means is disclosed, in which the controller operates the switching means depending on the rpm of the rotor to either connect in any of series and parallel or leave unconnected the high-tension winding and the low-tension winding, thereby giving any desired constant voltage.

In another aspect of the present invention, a magnetic flux control means is disclosed, in which the controller energizes the driving means to move circumferentially the annular member between an angular position where any clearance between any magnetic flux permeable piece in the annular member and the opposing tooth in the stator is made reduced so that the magnetic flux is unrestricted and another angular position where the clearance is made large so as to restrict the magnetic flux to thereby lower an output voltage.

In another aspect of the present invention, a magnetic flux control means is disclosed, in which the controller at low speed of the rotor energizes the switching means to connect in series the windings sets of the high-tension winding, thereby increasing the number of turns of the high-tension winding, whereas at high speed of the rotor gets the switching means to leave unconnected the winding sets of the high-tension winding from each other, and further when the rpm of the rotor starts to go too higher, the controller operates the driving means to move circumferentially the annular member, whereby the high-tension winding produces a preselected desired constant voltage.

In a further aspect of the present invention a magnetic flux control means is disclosed, in which the controller at low speed of the rotor energizes the switching means to connect in series the windings sets of the low-tension winding, whereas at high speed of the rotor gets the switching means to connect the winding sets of the low-tension winding in a way to reduce the number of turns, and further when the rpm of the rotor starts to go too higher, the controller operates the switching means to either connect in parallel or leave unconnected the winding sets and also energize the driving means to move circumferentially the annular member, whereby the low-tension winding produces a preselected desired constant direct-voltage.

In another aspect of the present invention, a magnetic flux control means is disclosed, in which the controller carries out connection control of the winding sets of the low-tension winding in a way corresponding to a signal for connection control of the winding sets of the high-tension winding.

In another aspect of the present invention, a magnetic flux control means is disclosed, in which a voltage created in the voltage-variable winding is rectified to a variable direct voltage.

In another aspect of the present invention, a magnetic flux control means is disclosed, in which the annular member is comprised of magnetic flux permeable pieces each of which is formed in a rectangular shape in cross section having a width less than that of the slot between any two adjacent teeth in the stator, the magnetic flux permeable pieces being arranged in juxtaposition along an inside periphery of the stator with nonmagnetic pieces being each interposed between any two magnetic flux permeable pieces, and the permeable pieces are each chamfered off at corners on a radially outside circumference of the rectangular shape in cross section to provide first chamfered areas, so that when any magnetic flux permeable piece is placed in opposition to any slot in the stator, first clearances of preselected amount are left between the first chamfered areas and widthwise opposing corners of the associated teeth on a radially inside circumference of the stator.

In a further another aspect of the present invention, a magnetic flux control means is disclosed, in which the tooth in the stator is chamfered off at its tooth tip corners to provide second chamfers so that the first clearances are formed in magnetic path clearances defined between the first and second chamfered areas.

In a further another aspect of the present invention, a magnetic flux control means is disclosed, in which a second clearance of preselected amount is provided between the inside periphery of the annular member and an outside periphery of the rotor.

In another aspect of the present invention, a magnetic flux control means is disclosed, in which the windings are wound on the teeth of the stator core in the stator so as to generate electricity in phase, and grouped into more than one winding set to be connected in series to vary a number of turns, while the controller serves for regulating angular position of the annular member with respect to the stator and further for connecting in series and/or in parallel the winding sets, depending on the rpm of the rotor, thereby giving a preselected desired voltage.

In another aspect of the present invention, a magnetic flux control means is disclosed, in which the annular member is arranged around an outside periphery of the stator and has magnetic flux control grooves cut into an inner peripheral surface thereof, with remaining ribs between the grooves, which are extended axially of the stator and spaced apart away from each other at regular intervals around the curved inner surface, so that the sequential ribs between the slots form at their inside tips a curved surface that comes into close sliding contact with the outside periphery of the stator. Moreover, the grooves inside the annular member are each made roughly equivalent in a circumferential length with any one tooth in the stator. An outside peripheral path for magnetic flux in the stator core is made less in width by a width of a magnetic path in the annular member.

In another aspect of the invention, a magnetic flux control means is disclosed, in which the magnetic flux passing through any tooth in the stator core is restricted when any groove in the annular member comes into radial alignment with the tooth, whereas the magnetic flux passing through any tooth in the stator core remains unrestricted when any rib in the annular member comes into radial alignment with the tooth.

In another aspect of the present invention, a magnetic flux control means is disclosed, in which the grooves in the annular member are charged with nonmagnetic solid lubricant to reduce a frictional resistance that is encountered when the annular member slides over the stator core.

In a further another aspect of the present invention, a magnetic flux control means is disclosed, in which the slots in the stator are charged with resinous strengthening material to improve stiffness of the stator.

In another aspect of the present invention, a magnetic flux control means is disclosed, in which the annular member is composed of a pair of annular halves, which are arranged so as to move circumferentially in directions opposite to each other by the action of the driving means.

In another aspect of the present invention, a magnetic flux control means is disclosed, in which the driving means is a reversible motor that has a reversible rotary shaft around which a clockwise thread and a counterclockwise thread are formed, while on the annular halves there are fixed nuts that have threads, each to each nut, mating the threads around the rotary shaft, respectively.

In another aspect of the present invention, a magnetic flux control means is disclosed, in which the windings are grouped into more than one winding set, which are different from each other in a number of turns wound on the teeth of the stator core in the stator, while the controller in response to the rpm of the rotor serves to control an angular position of the annular member with respect to the stator and further to make at least any one of series and parallel connections of the winding sets, thereby giving a preselected desirable voltage.

In another aspect of the present invention, a magnetic flux control means is disclosed, in which the controller, when the motor-generator operates as generator, connects the winding sets in series in response to a low rpm of the rotor to produce a high voltage, while connects any winding sets in parallel in response to a high rpm of the rotor to produce a large current with even desired voltage.

In another aspect of the present invention, a magnetic flux control means is disclosed, in which the controller, when the motor-generator operates as motor, connects the winding sets in series in response to a low rpm of the rotor to produce a high magnetic force, while connects any winding sets in parallel in response to a high rpm of the rotor to reduce the number of turns to provide a desired magnetic force.

In another aspect of the present invention, a magnetic flux control means is disclosed, in which with the windings shunt-wound in the stator core, conductors of the windings so wound as to become identical in phase are connected in series at a low rpm range and are led out on the way to reduce the number of turns as the rpm of the rotor increases, while the circumferentially shunt-wound windings are either connected in parallel or left unconnected with each other at a high rpm of the rotor to thereby allow, with being coupled with the angular position control of the annular member, to give either a constant voltage or a constant torque.

In another aspect of the present invention, a magnetic flux control means is disclosed, in which the windings on the stator are constituted in phase in matching with a number of poles of permanent magnets on the rotor, while the winding sets are connected in parallel, thereby providing the generator capable of producing a large current with even the desired voltage.

In another aspect of the present invention, a magnetic flux control means is disclosed, in which the annular member is arranged inside the stator and is comprised of density-rich magnetic flux permeable parts in which magnetic flux permeable materials are closely laminated in the form of a circle, and density-lean magnetic flux permeable parts in which magnetic flux permeable chips are arranged circularly in a manner spaced apart from each other at an interval of circumferential length equivalent to a circumferential width of the tooth and nonmagnetic chips are each arranged in a space left open between any two adjacent magnetic flux permeable chips, the nonmagnetic chips being made of nonmagnetic reinforcing material such as aluminum and so on, and the density-rich and density-lean magnetic flux permeable parts unlike in density being arranged alternately along the axial direction.

In another aspect of the present invention, a magnetic flux control means is disclosed, in which the magnetic flux permeable chips are arranged circularly in such a way to leave a space open between any two adjacent magnetic flux permeable chips, the space being equal in number to the teeth and provided at an interval of length equivalent to a circumferential width of the tooth in the stator. Moreover, both the density-rich magnetic flux permeable parts and the magnetic flux permeable chips are made of circular magnetic flux permeable plates laminated densely at an equal interval.

In another aspect of the present invention, a magnetic flux control means is disclosed, in which the density-lean parts of the annular member are each composed of annular magnetic flux permeable steel plates overlaid axially one on the other, the annular magnetic flux permeable steel plate being made of arched density-lean chips and density-rich chips, which are arranged in the form of cylinder in a manner spaced apart at an equal interval, and windows left open between chips unlike in density are filled with the nonmagnetic reinforcing material.

In a further another aspect of the present invention, a magnetic flux control means is disclosed, in which the density-rich parts of the annular member are each made of an axial lamination of a magnetic flux permeable ring and a silicon-steel plate, which are jointed together.

In another aspect of the present invention, a magnetic flux control means is disclosed, in which an annular member of thin silicon steel plate is press-fit inside an inner surface of the teeth in the stator.

In another aspect of the present invention, a magnetic flux control means is disclosed, in which the annular member is provided at axially opposing ends thereof with outer rings, each to each end, to keep the magnetic force against leaking out from the axially opposing ends, the outer rings being made of a silicon steel plate superior in permeability.

In another aspect of the present invention, a magnetic flux control means is disclosed, in which the annular member is arranged inside the stator, with an outside periphery thereof being kept in close contact with an inner tips of the teeth in the stator for sliding movement, and the driving means includes any axial end of the annular member, to which is applied a rotating force for moving circumferentially the annular member, a rod transmitting the rotating force to the axial end, and an actuator to move in and out the rod.

In another aspect of the present invention, a magnetic flux control means is disclosed, in which the windings are wound on the teeth of the stator core in the stator so as to generate electricity in phase, and grouped into more than one winding set to be connected in series to vary a number of turns, while the controller serves for regulating angular position of the annular member with respect to the stator and further for making series and/or parallel connections among the winding sets, depending on the rpm of the rotor, thereby giving a preselected desired voltage.

In a further aspect of the present invention, a magnetic flux control means is disclosed, in which the nonmagnetic piece is either replaced with air or made of any reinforcing member of aluminum, resinous material and so on. Moreover, the annular member is made of an axial lamination of more than one ring member in which the magnetic flux permeable piece and the nonmagnetic piece are overlaid one on the other.

In another aspect of the present invention, a magnetic flux control means is disclosed, in which the driving means is composed of any axial end of the annular member, to which is applied a rotating force for moving circumferentially the annular member, a rod transmitting the rotating force to the axial end, and an actuator to move in and out the rod. As an alternative, the driving means includes a d-c motor and the controller selects more than one position of the rod sensed by a position sensor and energizes the driving means to move in and out the rod. Moreover, the driving means includes a solenoid-operated valve having a rod connected to any one axial end of the annular member, while the controller selects more than one position of the rod sensed by a position sensor and transforms a load voltage applied to the solenoid operated valve, moving the rod to rotate the annular member.

In another aspect of the present invention, a magnetic flux control means is disclosed, in which the controller has an inverter function that rectifies an electric current produced at a preselected desired voltage to output an alternating-voltage of a preselected constant voltage.

According to the magnetic flux control means constructed as stated earlier, the actuator moves the annular member to any angular position where the most desirable clearance for magnetic path may be provided between the annular member and the teeth in the stator core. This allows adequate voltage control and producing any preselected constant voltage. In addition, the magnetic flux control means governs the on-off operation of the switching means to change over the connections among the high-tension windings, low-tension windings and the variable-voltage windings, thus giving the desired voltage.

As stated above, the magnetic flux control means of the present invention, making no attempt to use the conventional electric controls, relies instead on an unique combination of the angular position control of the annular member moved by the actuator and the connection control in the high-tension windings or low-tension windings by on-off operation of the switching means. This, as occurring no output loss, heating from any electronic elements and radio trouble due to high-frequency high-voltage, allows effective control of the magnetic flux, thus helping ensure the proper voltage control, for example making it possible to produce any preselected desirable constant-voltage such as 100V~200V, 12V~27V and so on with less subject to the influence of variation in rpm of the rotor.

In the motor-generator of the present invention, the nonmagnetic pieces of aluminum or aluminum alloys charged by casting or the like between any two adjacent magnetic flux permeable pieces contribute to the improvement of stiffness in the annular member, which controls effectively the magnetic flux, depending on the revolving conditions of the rotor. Thus, the annular member may resist well against the reaction with the result of the improvement in durability. Accordingly, the present magnetic flux control means for the motor-generator will be suitable for use in, for example high-speed generators and motors for the conversion of mechanical energy into electrical energy or, conversely, electrical energy into mechanical energy, power supply sources for energizing refrigerators or coolers mounted on vehicles, electric power sources to energize a heater in the diesel particulate filters, generators combined in cogeneration system, electric rotating machinery coupled with the automotive engine in a hybrid vehicle, and high-speed motors operating machines such as machine tools. It is to be noted that the motor-generator with the magnetic flux control means of the present invention tolerates well the high speed of, for example 60,000 rpm, and is made slim in construction with even less production costs.

With the magnetic flux control means constructed as stated earlier, the magnetic flux permeable pieces in the annular member is made smaller in circumferential width than the slot defined between any two adjacent teeth in the stator, while chamfered off at the surface opposing the teeth tips in the stator. The construct results in providing the clearance for magnetic path between the annular member and the stator teeth, which is most suitable for proper voltage control.

In case where the motor-generator on board the vehicle is needed to serve as a electric power source of, for example 100V for power applications, the developed electric power has been conventionally subjected to phase control, then chopped in current through electric elements such as any transistor, thyristor and so on, and further the chopped voltage has been regulated with being plagued with a high-frequency power caused by the chopper circuit, then followed by rectification to be converted into an alternating current of 100V through an inverter. As opposed to the conventional way stated just above, the magnetic flux control means of the present invention has no need of phase control and, therefore does not require the electric elements as stated earlier.

Besides, since the conventional motor creates a counter emf as the rpm of the rotor increases, it takes a driving electric power of high tension enough to overcome the counter emf. In contrast, the motor-generator with the magnetic flux control means of the present invention, as allowing to suppress the development of the counter emf, succeeds in much reducing the driving electric power.

In the magnetic flux control means of the present invention, moreover, there is provided the annular member containing a skeletal structure of magnetic flux permeable pieces chamfered at their circumferentially opposing corners on the radially-outside curved surface, and nonmagnetic pieces of aluminum and so on less in relative permeability poured by casting in the spaces between any adjacent magnetic flux permeable pieces to surround around each the magnetic flux permeable pieces, including their chamfered tips. Thus, the magnetic flux control means of the present invention is not only improved in electromagnetic property, but also made steady in mechanical stiffness so as to be able to stand up certainly the reaction.

When the rpm of the rotor starts to go too higher, the annular member high in stiffness is moved circumferentially to any angular position where any magnetic flux permeable piece is offset circumferentially out of the radial alignment with the associated tooth in the stator, so that the magnetic flux passing through the teeth will be restricted to make the produced power less in voltage. To cope with such event that a simple movement of the annular member is insufficient to restrict the magnetic flux to the extent where the developed power at high speed in rpm of the rotor may be lowered to a desirable voltage, the windings laid in the slots in the stator are made to be varied in a number of turns. That is to say, the windings are grouped into more than one winding set that may be changed in connection among them. Thus, the winding sets at low speed in rpm of the rotor are connected in series to increase the number of turns, whereas at high speed connected in parallel or left alone to reduce the number of turns. This allows regulating the developed power to give a preselected desirable voltage, thus makes it possible to easily produce a constant d-c voltage of, for example 100V for automotive auxiliaries, especially would make easy to give a constant voltage in the three-phase generators.

In the magnetic flux control means of the present invention, there is provided an annular member that density-rich magnetic flux permeable pieces are arranged circularly in a continual manner so that the part subjected to wear continues around the overall periphery. This arrangement allows reducing uneven wear to the minimum, thereby not only making the steady sliding revolution possible but also realizing strength retention of the annular member itself. According to the magnetic flux control means having the annular member in which the magnetic flux permeable pieces are chamfered at their widthwise opposing corners, the clearance defined between the annular member and any tooth in the stator may be reduced to an extent of 0.05~0.1 mm, while the clearance between the annular member and the rotor will be reduced to an extent of 0.5~0.1 mm, so that the loss in magnetic path may be much reduced. Moreover, this allows keeping the clearance between the annular member and the rotor minimum and correspondingly raising efficiency.

As an alternative, there is provided a magnetic flux control means in which the annular member is arranged around an outside periphery of the stator and has magnetic flux control grooves cut into an inner peripheral surface thereof, with remaining ribs between the grooves. With the annular member modified as stated earlier, the magnetic flux will have nowhere to pass when the ribs in the annular member are displaced out of the teeth in the stator, so that the magnetic flux is restricted. Nevertheless, the modified annular member is apt to experiences uneven movement due to a reaction that is caused by bending the magnetic path when the magnetic flux is restricted. To cope with this, the annular member is divided axially into two halves, which are allowed to move circumferentially in directions opposite to each other to thereby counteract the reaction, thus helping ensure the smooth angular movement of the annular member. Moreover, the modified annular member, as made of monolithic material high in strength and permeability, is free of any problem in mechanical strength. Accordingly, the modified annular member is made steady in mechanical strength and also less subject to uneven wear, which might otherwise occur in the ribs in the annular member sliding over the stator, thus, ensuring the steady sliding movement along the stator.

When the rpm of the rotor starts to go too higher, the annular member high in stiffness slides circumferentially to any angular position where any rib is shift circumferentially out of the associated tooth in the stator core, instead any groove is placed in radial alignment with the tooth, so that the magnetic flux passing through the teeth will be restricted to make the produced power less in voltage. To cope with such event that a simple movement of the annular member is insufficient to restrict the magnetic flux to the extent where the developed power at high speed in rpm of the rotor may be lowered to a desirable voltage, the windings laid in the slots in the stator are grouped into more than one winding set that may be changed in connection among them to vary the number of turns in the windings. Thus, the winding sets at low speed in rpm of the rotor are connected in series to increase the number of turns, whereas at high speed connected in parallel or left alone to reduce the number of turns. This allows regulating the developed power to give a preselected desirable voltage, thus makes it possible to easily produce a constant d-c voltage of, for example 100V for energizing various auxiliaries onboard vehicle.

In the magnetic flux control means constructed as described above, the annular member may be kept minimum in uneven wear so as to ensure the certain strength of the annular member itself. In contrast, although the stator cooperating with the annular member in the magnetic flux means is made discontinuous between any tooth and the adjacent slot, an occurrence of interference and so on will be eliminated by circumferential close contact of the annular member with the outside peripheral path for magnetic flux of the stator core. According to the magnetic flux control means having the modified annular member constructed as stated earlier, moreover the clearance across between the annular member and any tooth in the stator may be reduced to an extent of 0.05~0.1 mm, so that the loss in magnetic path may be much reduced. Moreover, this also allows keeping the clearance between the teeth in the stator core and the rotor minimum and correspondingly raising efficiency.

As a further alternative, there is provided a magnetic flux control means having the annular member, which is comprised of density-rich magnetic flux permeable parts in which magnetic flux permeable materials are closely laminated in the form of a circle, and density-lean magnetic flux permeable parts in which magnetic flux permeable chips are arranged circularly in a manner spaced apart from each other at an interval of circumferential length equivalent to a circumferential width of the tooth and nonmagnetic chips are each arranged in a space left open between any two adjacent magnetic flux permeable chips, the nonmagnetic chips being made of nonmagnetic reinforcing material such as aluminum and so on, and the density-rich and density-lean magnetic flux permeable parts unlike in density being arranged alternately along the axial direction. With the magnetic flux control means constructed as state just above, the magnetic flux will have nowhere to pass in an event where any magnetic flux permeable chip is placed out of the teeth in the stator, so that the rotor should not be able to revolve with smoothness. But the presence of the density-rich parts, although restricting the magnetic flux, helps ensure the smooth rotation of the rotor. Moreover, the annular member is apt to experiences a reaction that is caused by bending the magnetic path when the magnetic flux is restricted. To cope with this, the nonmagnetic chips are made of reinforcing materials such as aluminum and so on, instead of resinous material, thus resisting well against the reaction. The density-rich part in the annular member, since made of a circular continuity, not only contributes to increasing strength of the annular member, but also makes the surface sliding over the stator smooth, thereby keeping the uneven wear minimum. This helps always ensure the steady angular movement of the annular member. In other words, the stator is made circumferentially discontinuous between the slots and the teeth alternating circularly, whereas the annular member has some continuities of density-rich magnetic flux permeable part, arranged axially in a manner spaced apart from each other at an axial interval. This allows the annular member to move circumferentially with smoothness.

When the rpm of the rotor starts to go too higher, the annular member high in stiffness slides circumferentially to any angular position where any permeable chip is offset circumferentially out of the associated tooth in the stator, so that the magnetic flux passing through the teeth will be restricted to make the produced power less in voltage. Moreover, to cope with such condition that a simple movement of the annular member is still insufficient to restrict the magnetic flux to the extent where the developed power at high speed in rpm of the rotor may be lowered to a desirable voltage, the windings laid in the slots in the stator are made to be varied in a number of turns. That is to say, the windings are grouped into more than one winding set that may be changed in connection among them. Thus, the winding sets at low speed in rpm of the rotor are connected in series to increase the number of turns, whereas at high speed connected in parallel or left unconnected alone to reduce the number of turns. This allows regulating the developed power to give a preselected desirable voltage, thus makes it possible to easily produce a constant voltage of, for example 100V for various auxiliaries onboard vehicle.

The density-rich part in the annular member, since formed as a circular continuity, has the continuous surface allowed sliding circumferentially over the stator with smoothness, thereby keeping the uneven wear minimum. This helps always ensure not only the steady angular movement of the annular member, but also the secure strength of the annular member itself. In the magnetic flux control means constructed as stated above, although the stator is made discontinuous between any tooth and the adjacent slot, an occurrence of interference and so on will be eliminated by circumferentially close contact of the density-rich parts in the annular member with the stator core.

In the meantime when two solid surfaces slide or tend to slide over each other, the smoother the rubbing surfaces are made, the easier the surfaces are allowed sliding one another. The magnetic flux control means of the present invention has a construction well suited for operating on the physical principle stated just above. A hollow cylinder of thin silicon steel sheet is press-fit inside the inner periphery of the teeth in the stator to make the inner surface of the stator even to provide a smooth angular movement of the annular member. Typically, the rotor, as long in axial direction, is apt to be bent and, therefore sometimes subject to pole interference at any unbalanced area. With the permanent-magnet motor-generators, the problem stated earlier becomes critical because the air gap should be made less to establish the greater magnetic force. In contrast, the air gap increased in clearance to keep the rotor against the contact with the annular member disadvantageously results in much loss in magnetic force. In the permanent-magnet motor-generator, there is provided a construction in which the hollow cylinder is press-fit inside the teeth in the stator to help reduce the clearance between the annular member and the teeth in the stator.

If considering the stiffness of the annular member, the annular member, since small in inside diameter with even, is lacking in stiffness. The annular member, when experiencing at any axial end thereof a torque trending to rotate it, will make an attempt to return against a force bending the magnetic force. Thus, the annular member as a whole experiences a large twisting motion. To cope with this twisting motion, the annular member of the present invention has embedded with strengthening material such as aluminum and so on to have the stiffness enough to stand up against the twisting motion. Moreover, the magnetic force of the permanent magnet is very great and therefore the flux density in the magnetic path exhibits about 0.4 tesla even if cast iron is used. This means that when the magnetic path is restricted at axially opposing ends of the rotor, the magnetic force will leak out outside the motor-generator. To cope with this, it will be preferred to arrange discs of any material superior in permeability on the axially opposing ends of the annular member, each to each end.

Other objects and features of the present invention will be more apparent to those skilled in the art on consideration of the accompanying drawings and following specification wherein are disclosed preferred embodiments of the present invention with understanding that such variations, modifications and elimination of parts may be made therein as fall within the scope of the appended claims without departing from the spirit of the invention.

BRIEF DESCRIPTION OF THE DRAWINGS

FIGS. 6 (I) and 6(II) are fragmentary enlarged sections explaining relative relations between a stator and an annular member, wherein FIG. 6(I) shows an event where the annular member is placed to the position of FIG. 4 while FIG. 6(II) is another event where the annular member is moved to the position of FIG. 5:

DETAILED DESCRIPTION OF THE PREFERRED EMBODIMENTS

A magnetic flux control means for a motor-generator in accordance with the present invention will be hereinafter described with reference to the accompanying drawings. The present motor-generator with the magnetic flux control means of the present invention is suitable for use in the electromechanical energy converters; for example generators coupled at their rotor shaft with an engine for cogeneration system, motors using the generated power to drive the refrigerators or coolers onboard vehicles, electric power sources to energize a heater in the diesel particulate filters, electric rotating machinery serving as either a generator or a motor coupled with the automotive engine in a hybrid vehicle having mounted with a combustion engine and a motor-generator, and small motors operating machines such as machine tools in accordance with instructions issued from a controller.

Referring first to FIGS. 1 to 6, there is shown a preferred embodiment of a magnetic flux control means for a motor-generator of the present invention.

Figure 3:
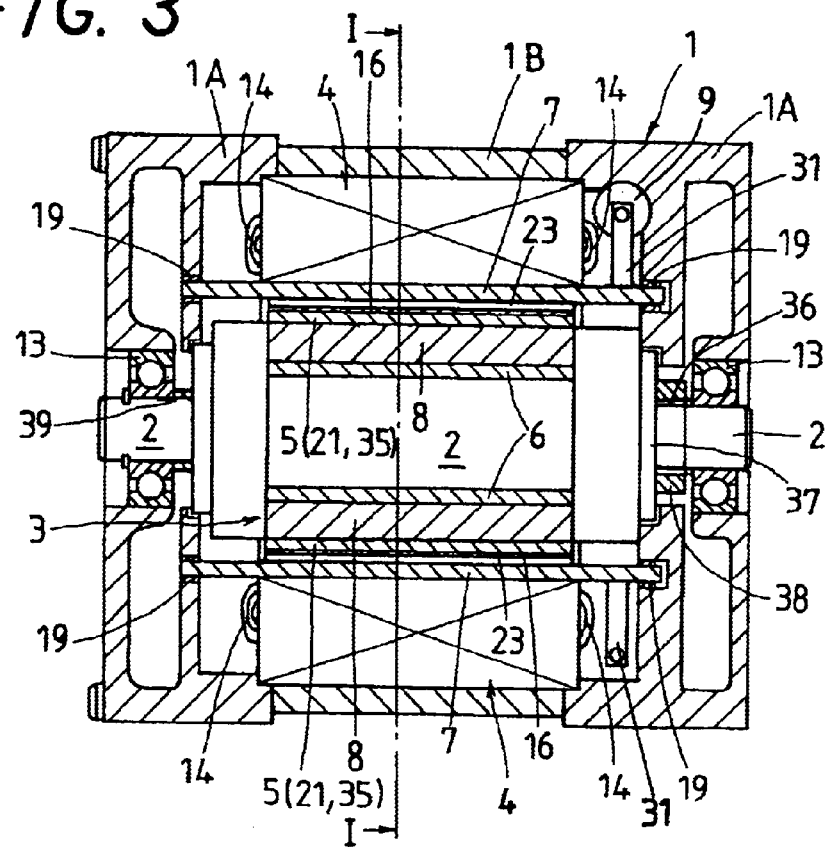
FIG. 3 is an axial section showing a preferred embodiment of the magnetic flux control means in accordance with the present invention.
Figure 4:
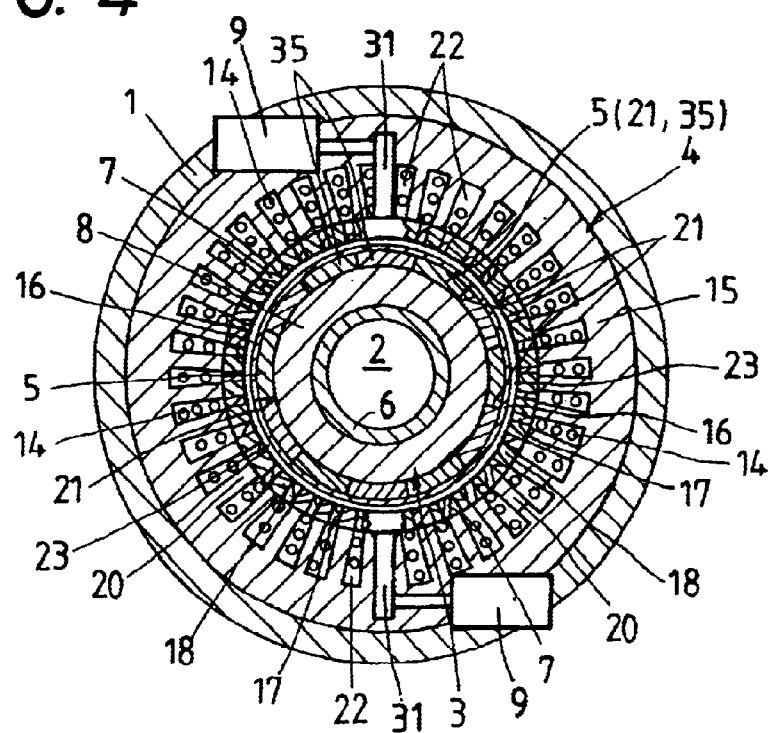
FIG. 4 is a cross-sectional view of the magnetic flux control means of FIG. 3 taken on the plane I—I of that figure, wherein an annular member is moved to an angular position where magnetic flux is restricted.
Figure 5:
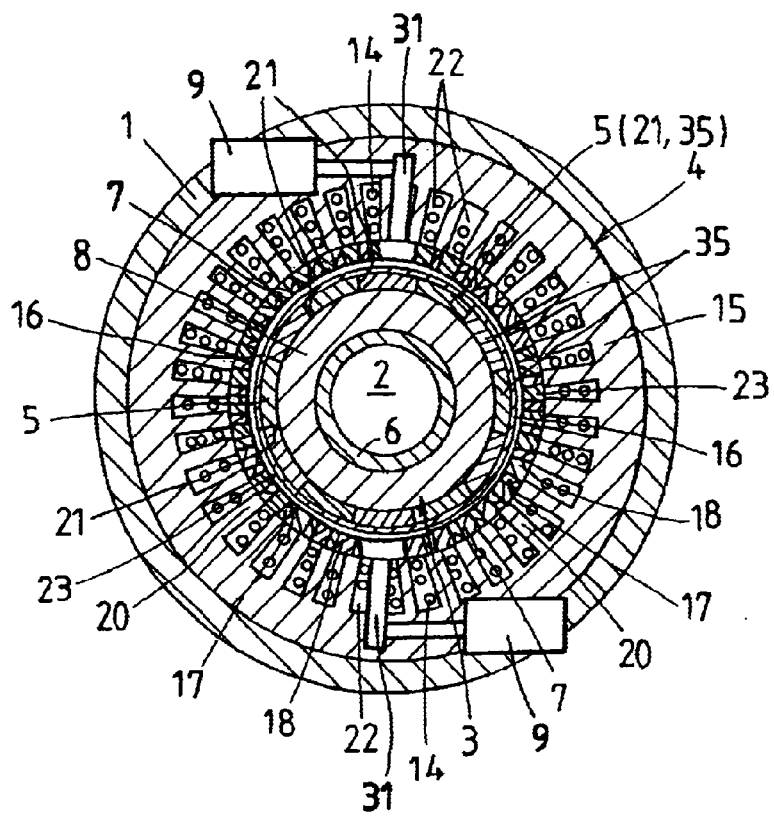
FIG. 5 is a cross-sectional view of the magnetic flux control means of FIG. 3 taken on the plane I—I of that figure, wherein an annular member is moved to another angular position where the magnetic flux is remained unrestricted.

The motor-generator having incorporated with a first embodiment of the magnetic flux control means, as especially shown in FIGS. 3 to 5, is comprised of a stator hosing 1 accommodating therein a rotor 3 of moving side and a stator 4 of stationary side and also serving as a magnetic force passage, a rotor shaft 2 supported for rotation in the stator housing 1 through a pair of ball bearings 13, 13, the rotor 3 having a permanent-magnet member 5 arranged around the rotor shaft 2, the stator 4 being fixed to the stator housing 1 with being spaced apart from the outside periphery of the rotor 3, an annular member 7 supported inside the stator 4 for rotation relative to the stator 4 through bearing means 19, and an actuator 9 of driving means to move the annular member 7 with respect to the stator 4 in response to any operating condition of the rotor 3. As seen from FIG. 3, the stator housing is composed of a pair of axially opposing side sections 1A, 1A and an intermediate section 1B of bolts and so on to joint together the opposing side sections 1A, 1A.

The stator 4 includes a stator core 15 of laminated steel sheets carrying windings 14 in slots 22 in its inside periphery. The stator 4 is comprised of the toothed stator core 15 fixed to the stator housing 1 and provided inside periphery thereof with stator teeth 20 arranged circumferentially in a manner spaced apart from each other to separate two adjacent stator slots 22, and windings 14 wound on stator teeth 20. The annular member 7 is arranged inside the stator core 15 for angular movement relative to the stator 4 with keeping a sliding contact with the stator teeth 20 remaining between the slots 22 cut in the inside surface of the stator core 15. The annular member 7, although supported in the stator housing 1 for rotation through, for example the bearing means 19, may be alternatively fit in the stator core 15 for sliding rotation relative to the stator 4 with no use of the bearing means 19.

The rotor 3 is composed of a magnetic path 6 arranged around the rotor shaft 2, a magnetically permeable member 8 arranged over the outside periphery of the cylindrical magnetic path 8, a permanent-magnet member 5 made of more than one permanent-magnet piece 35 extended axially and arranged circumferentially over the outside periphery of the magnetic permeable member 8 with nonmagnetic pieces 21 being each interposed between any two adjoining permanent-magnet pieces 35, and a nonmagnetic reinforcing member 16 secured over the outside periphery of the permanent-magnet member 5. The magnetic path 6 is composed of more than one magnetic flux permeable pieces and nonmagnetic pieces, which are arranged to form a cylinder in a manner they alternate each other circularly around rotor shaft 2. The rotor 3 is clamped between axially opposite retainer plate 26 and backing plate 22, which are abutted against axially opposing ends of the rotor 3, each to each end, and kept on the rotor shaft 2 against rotation by tightening a fixing nut 38 on an externally threaded end 36 of the rotor shaft 2. A motor-generator pulley, although not shown, fixed to any one end of rotor shaft 2 is connected through a belt to an output shaft of an engine. The annular member 7 is arranged around the rotor 3 to form an annular clearance 23 between them.

Figure 6:
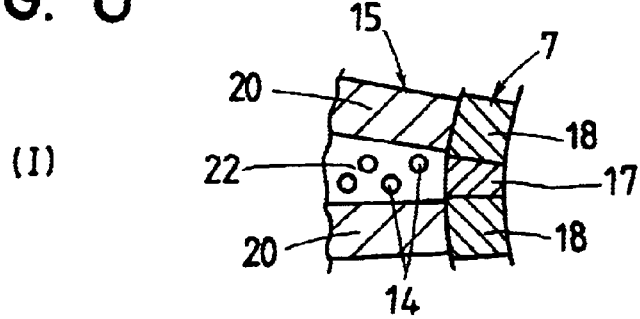
Figure 6:
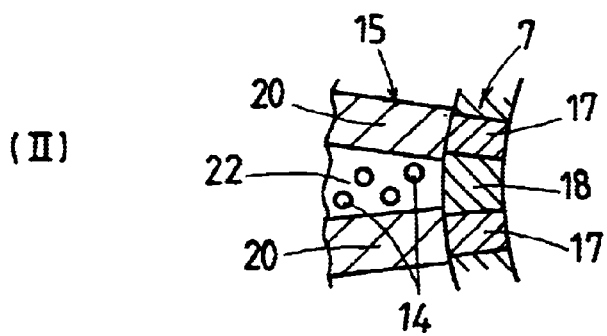
Figure 7:
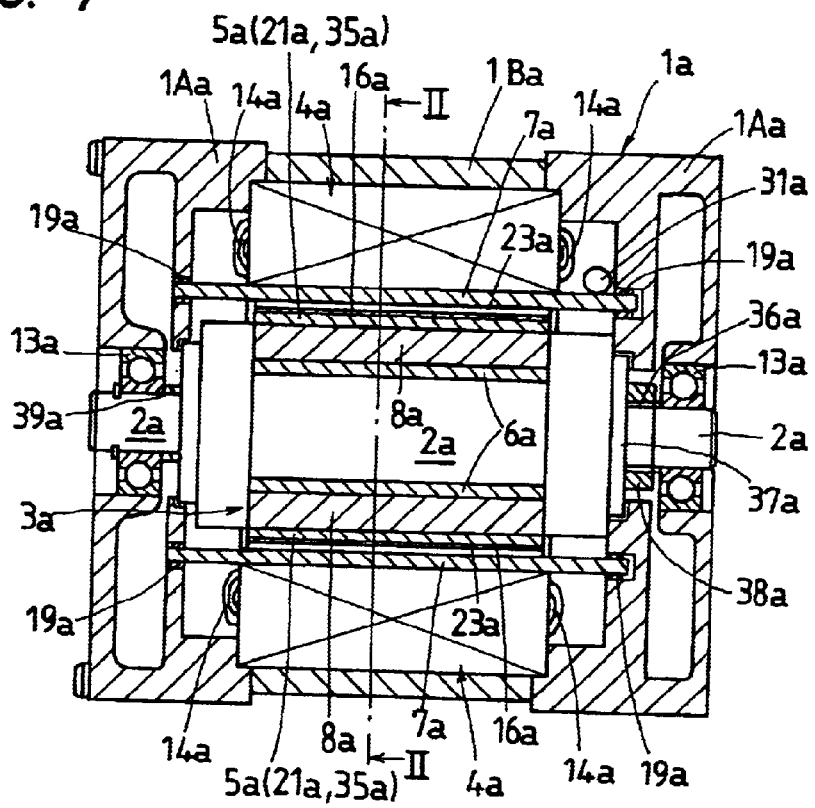
FIG. 7 is an axial section showing a second embodiment of the magnetic flux control means in accordance with the present invention.
Figure 8:
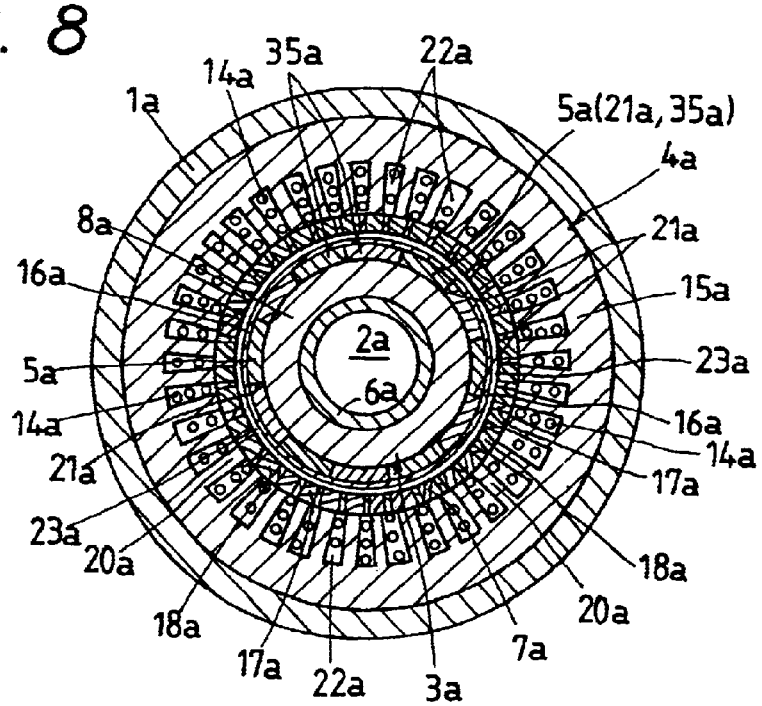
FIG. 8 is a cross-sectional view of the magnetic flux control means of FIG. 7 taken on the plane II—II that figure, wherein an annular member is moved to an angular position where the magnetic flux is remained unrestricted.

The magnetic flux control means of the present invention, as shown in FIGS. 4 to 6, has the annular member 7 arranged inside the stator for angular movement with keeping sliding contact with the inside surface of the stator 4, and an actuator 9 to move circumferentially the annular member 7 through a rod 31 connected to the annular member 7. The annular member 7 is composed of more than one magnetic flux permeable piece 17 arranged circumferentially in a way spaced apart from each other with nonmagnetic pieces 18 being each interposed between any two adjoining magnetic flux permeable pieces 17. As seen from FIGS. 6(I) and 6(II) explaining positional relation between the stator core 15 and the annular member 7, the magnetic flux permeable piece 17 of the annular member 7 is made somewhat less in circumferential width than the tooth 20 of the stator core 15. A controller 10 is to govern the rotating movement of the annular member 7 to vary an overlap area between the confronting magnetic flux permeable piece 17 and tooth 20, thereby controlling the degree to which the magnetic flux is restricted.

With the annular member 7 in which the magnetic flux permeable pieces 17 are arranged in the form of cylinder with the nonmagnetic piece 18 being each interposed between any two adjoining magnetic flux permeable pieces 17, the magnetic flux permeable piece 17, as shown in FIGS. 6(I) and 6(II), is made less in circumferential width than either the tooth 20 or the slot 20 of the stator 4. Although not shown in detail, the nonmagnetic piece 18 may be either replaced with air or made of any one of aluminum, resinous material and so on. The annular member 7, although not shown, may be constructed with annular discs laminated axially, each of which is composed of magnetic flux permeable pieces 17 and nonmagnetic pieces 18 alternating each other circularly. In this alternative, the nonmagnetic piece 18 may be either replaced with air or made of any one of aluminum, resinous material and so on. Each magnetic flux permeable piece 17 is less in circumferential width than the tooth 20. But the number of the magnetic flux permeable pieces 17 is set equal to the number of the teeth 20. As an alternative, the annular member 7 may be built up of laminations juxtaposed axially, each of which is made of an annular disc of the magnetic flux permeable piece 17 and a silicon steel sheet laid one on top of another.

Figure 1:
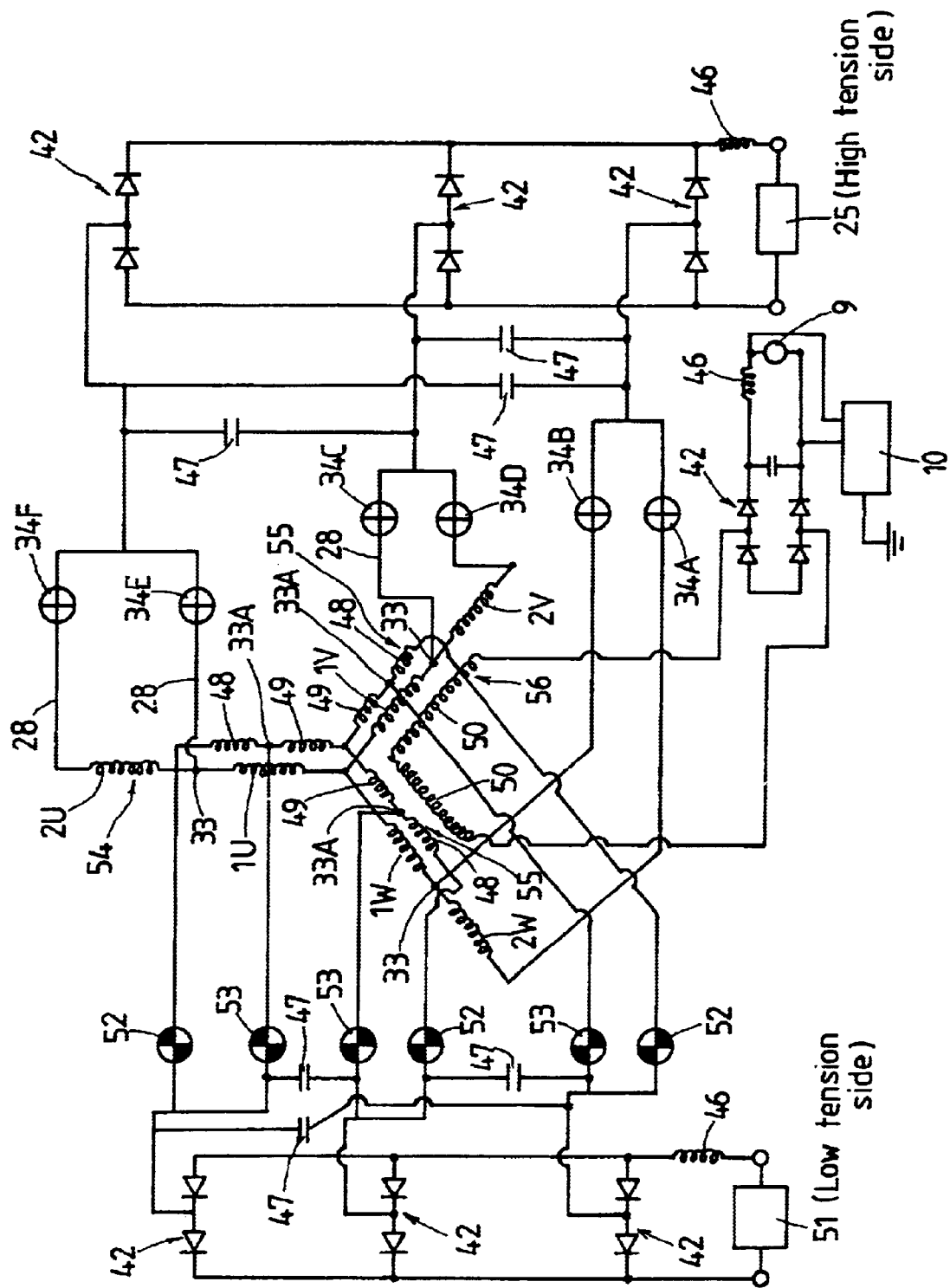
FIG. 1 is a circuit diagram explanatory of a preferred embodiment of a winding connection in a magnetic flux control mean for a permanent-magnet motor-generator in accordance with the present invention.

Windings 14 placed in the stator 4 are grouped into a high-tension winding 54 for high-voltage power source composed of more than one winding set 1U-1V-1W, 2U-2V-2W and 3U-3V-3W, only any two winding sets being shown in FIG. 1, a low-tension winding 55 composed of winding sets 48, 49 for three-phase current, and a variable-voltage winding 56 for voltage control composed of at least one winding set 50. The controller 10 serves for controlling the on-off operation of a switching means to change over connections among the windings 14, and also for energizing the actuator 9 to make position control of the annular member 7 with respect to the stator 4 in accordance with the rpm of the rotor 3. That is to say, in the motor-generator with the magnetic flux control means of the present invention, three types of the windings; for example high-tension winding 54 for main power source, low-tension winding 55 for automotive electrical equipment and voltage-variable winding 56 for the control of voltage are placed in the stator 4. With the motor-generator constructed as stated earlier, for example the high-tension winding 54 will produce a three-phase alternating current of 100V in effective value, whereas the low-tension winding 55 will produce a three-phase alternating current, it could be a single-phase current according to circumstances, of 27V in effective value. Moreover, the winding 56 for controlling the voltage to energize the actuator 9 will produce a variable-voltage single-phase a-c. The three-phase a-c of higher tension is changed to, for example a single-phase d-c of 100V while the lower tension for automotive electrical system is converted to a d-c of 27V. Besides, the control voltage is rectified to a variable-voltage d-c to energize the actuator 9.

The controller 10 will energize the actuator 9 to rotate the annular member 7 to any angular position where a clearance between any magnetic flux permeable piece 17 of the annular member 7 and the associated tooth 20 of the stator 4 is made small so that the magnetic flux is less subject to restriction. In contrast, when the annular member 7 is moved to another angular position where the clearance is made large, the magnetic flux is much restricted to lower the output voltage. In addition, the controller 10 actuates the switching means to thereby connect selectively any of the winding sets 1U-1V-1W, 2U- V-2W and 3U-3V-3W of the high-tension winding 54 in parallel and/or in series, or leave unconnected from each other to regulate the high-tension winding to produce a desired constant d-c voltage. The main windings 14 for the high-tension winding 54 are each divided into two halves. At low speed in rpm of the rotor, the output developed with the overall windings 14 is supplied to a heavy load side of a high-tension power source 25 to energize the actuator 9, thereby moving the annular member 7 so as to yield the desired constant direct-voltage, for example 100V. In contrast, when the rpm of the generator or the rotor 3 rises to the degree to which the angular control of the annular member 7 is impossible of the realization of flux control, the switching means are energized to reduce the number of turns in the main windings, thereby yielding the desired constant direct-voltage, for example 100V.

The controller 3, at the low speed in rpm of the rotor 3, operates to make the switching means 34A~34F connect in series the winding set 1U-1V-1W and the winding set 2U-2V-2W for producing the desired constant direct-voltage. As opposed to the above, at the high speed in rpm of the rotor 3 the controller 3 operates to make the switching means either connect in parallel or leave unconnected from each other the winding set 1U-1V-1W and the winding set 2U-2V-2W, and at a further higher speed of the rotor 3 the controller 3 energizes the switching means to either connect in parallel the winding set 1U-1V-1W and the winding set 2U-2V-2W or leave unconnected from each other the while energizes the actuator 9 to move circumferentially the annular member 7, thereby regulating the output of the high-tension winding 54 to the desired constant direct-voltage.

On the low-tension winding 55 for the automotive electrical equipment according to the embodiment shown in FIG. 1, the winding contained in the stator is divided into two winding parts 48, 49, which are connected with each other at connecting points 33A so as to control the magnetic flux as in the high-tension winding 54 thereby allowing control of the voltage for the speed range of from low speed to medium speed in rpm of the rotor 3. As the rpm of the generator or the rotor 3 rises to the degree to which the annular member 7 is impossible of the voltage control, the switching means 52, 53 are energized to reduce the number of turns in the windings, thereby allowing the annular member 7 to realize the voltage control. Control signal for the low-tension winding 55 has only to be matched the control signal for the high-tension winding 54. In order to ensure the desired constant direct-voltage in the low-tension winding 55, the controller 10 at the low speed in rpm of the rotor 3 operates the switching means 52, 53 to either connect in series or leave unconnected from each other the winding parts 48, 49 of the low-tension winding 55, whereas at the high speed in rpm of the rotor 3 operates the switching means to either connect in parallel or leave unconnected from each other the winding parts 48, 49 of the low-tension winding 55, and further when the rpm of the rotor 3 starts to go too higher, the controller 10 operates the switching means to either connect in parallel or leave unconnected alone the winding parts 48, 49 of the low-tension winding 55, while energizing the actuator 9 to move the annular member 7 circumferentially of the stator.

The connection control of the winding parts 48, 49 of the low-tension winding 55 by the controller 10 will be conducted in matching with signals for connection control of the winding sets 1U-1V-1W, 2U-2V-2W and 3U-3V-3W of the high-tension winding 54. Moreover, the voltage developed in the variable-voltage winding 56 is rectified to a direct-variable voltage. Besides, the controller 10 has an inverter function to rectify the output current of the preset voltage to a desired constant direct-voltage.

The actuator 9 is composed of, for example a solenoid-operated valve having a connecting rod 31 fixed to any axial end of the annular member 7. The controller 10 moves the connecting rod 31 of the solenoid-operated valve to rotate in increments the annular member 7 to any angular position selected out of more than one position of the annular member 7 by the use of any position sensor. With the actuator 9 in which the connecting rod 31 is fixed at opposing ends thereof to the solenoid-operated valve and any axial end of the annular member 7, controlling a current in a coil of the solenoid-operated valve causes the connecting rod 31 to move in and out, thereby rotating the annular member 7 in increments, either clockwise or counterclockwise, so that the magnetic flux permeable piece 17 and nonmagnetic piece 18 are displaced in angular position with respect to the associated tooth 20 in the stator 4. Thus, the actuator 9 will vary the voltage loaded on the solenoid-operated valve, for example depending on the position of the connecting rod 31 monitored by the position sensor. With the solenoid-operated valve being applied with a large voltage, for example, the annular member 7 is driven to move circumferentially. As the voltage is reduced, the annular member 7 will come to rest at the desired position. As an alternative, the annular member 7 is provided with for example a return spring to make it easy to keep the annular member 7 at any desired position. Moreover, the annular member 7 may be provided at axially opposing ends thereof with outer rings, each to each end, to keep the magnetic force against leaking out from the axially opposing ends.

The windings 14 laid in the sequential slots 22 of the stator 4, aside from the embodiment recited above, are wound on the teeth 20 of the stator core in the stator so as to generate electricity in phase, and grouped into more than one winding set, for example three winding sets to be connected in series to provide loops or turns identical with and/or different in number from each other. With three winding sets, any two are connected with each other while the residual winding set is used for other output.

The controller 10 has rectifiers 42 including diodes and condensers 47 to rectify the output power of the desired voltage to a d-c, and also inverters to convert the output power of the desired voltage to an a-c of for example 100V and 50~60 Hz. In the windings 14 to create a three-phasecurrent, subdivided windings 1U and 2U, subdivided windings 1V and 2V and subdivided windings 1W and 2W are each connected in series at the connection points 33 that are connected through lines 28 to switches 34 (34A, 34B, 34C, 34D, 34E and 34F). Thus, the controller 10 in response to the rpm of the rotor 3, controls the on-off operation of the switches 34 to connect more than one winding set either in parallel or in series with each other and further moves circumferentially the annular member 7 relative to the stator 4, thereby give the high-tension power supply 25 of the desired constant direct-voltage.

Figure 2:
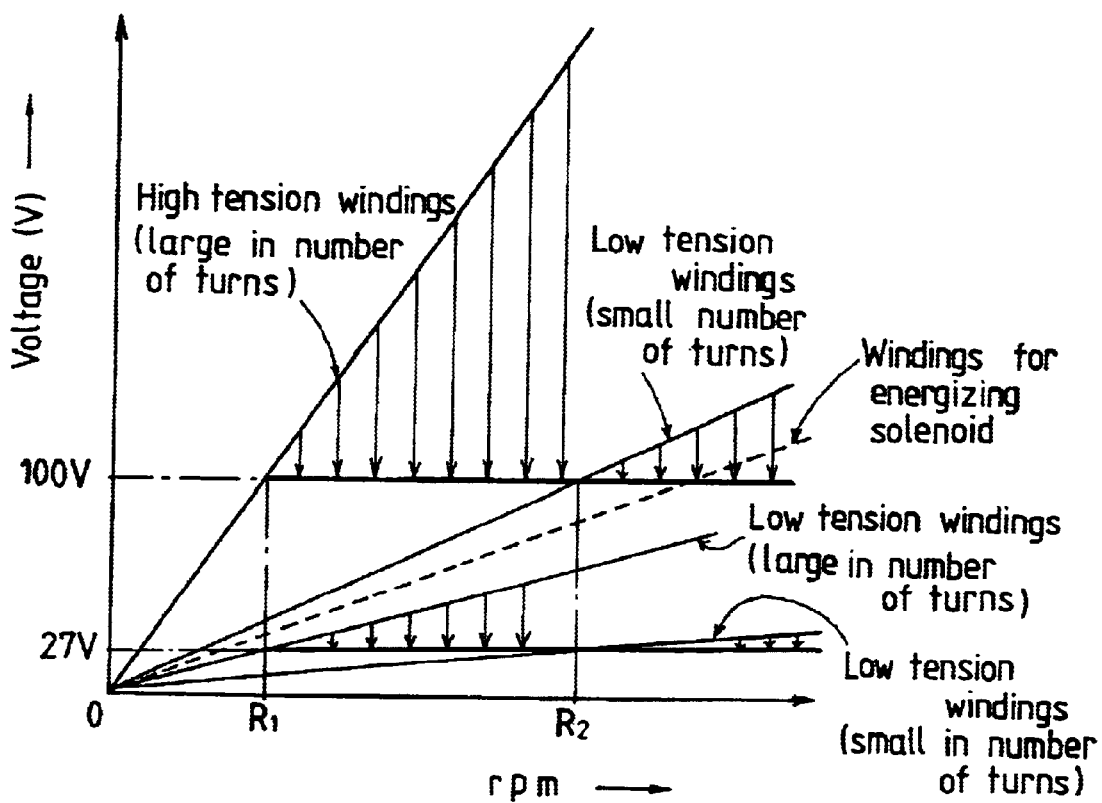
FIG. 2 is a graphic representation showing revolving speed or rpm vs. output voltage produced by the magnetic flux control means shown in FIG. 1.

The controller 10, when controlling the high-tension winding 54 for main power supply, turns on the switch 34B, switch 34C and switch 34E, while turns off the residual switches, thus all winding sets are left unconnected from one another thereby giving the corresponding output voltage. When the switch 34A, switch 34D and switch 34F are turned on while other switches are turned off, any two winding sets come into series connection, thus producing another corresponding voltage. When the controller 10 makes a series connection between the two winding sets 1U-1V-1W and 2U-2V-2W, the number of loop or turn of the windings 14 becomes large, for the sake of which the desired constant voltage, for example 100V will be created whenever the rpm of the rotor 3 reaches a preselected rpm ($R_1$). Even if the rpm of the rotor 3 increases above another preselected rpm ($R_2$), only the angular movement of the annular member 7 is impossible of control the produced power to the desired constant voltage, or 100V. To cope with the event stated just above, the two winding sets 1U-1V-1W and 2U-2V-2W previously connected in series are changed to a parallel connection or disconnected separately whereby the number of turns in the windings 14 is made reduced so that the angular movement of the annular member 7 will be able to control the produced power to the desired constant voltage, or 100V. Thus, the controller 10 governs the on-off operation of the switching means in accordance with the rpm of the rotor 3, thereby yielding the output voltage (V) of the constant alternating-voltage as shown in FIG. 2. Moreover, the windings 14 on the stator 4 are constituted in phase in matching with the number of poles of permanent magnets on the rotor 3, while the winding sets 1U-1V-1W and 2U-2V-2W are connected in parallel, thereby providing the generator capable of producing a large current with even low voltage.

The controller 10, when controlling the three-phase low-tension winding 55 for the automotive electrical equipment, turns on switches 52 while turns off switches 53, thereby connecting in series the windings 48, 49 with each other at connecting points 33A. In contrast, as the controller 10 turns off the switches 52 and turns on the switches 53, the windings 48 are made null while only the windings 49 make a three-phase connection of windings. Electric power created in the low-tension winding 55 for the automotive electrical equipment is given to a power supply of low-tension side such as batteries and so on through a rectifier 42 and a coil 46 to be either stored in the batteries or consumed to drive the vehicle. When the controller 10 makes a series connection between the two windings 48 and 49, the number of turns of the windings 14 becomes large, for the sake of which the desired constant direct-voltage, for example 27V will be created whenever the rpm of the rotor 3 reaches a preselected rpm ($R_1$). Even if the rpm of the rotor 3 increases above another preselected rpm ($R_2$), only the angular movement of the annular member 7 is impossible of control the produced power to the desired constant voltage, or 27V. To cope with the event stated just above, the two windings 48 and 49 previously connected in series are changed to a parallel connection or disconnected separately whereby the number of turns in the windings 14 is made reduced so that the angular movement of the annular member 7 will be able to control the produced power to the desired constant voltage, or 27V. Thus, the controller 10 governs the on-off operation of the switching means 52, 53 in accordance with the rpm of the rotor 3, thereby yielding the output voltage (V) of the constant direct-voltage as shown in FIG. 2.

With the variable-voltage winding 56, as the rotor 3 is driven, the windings 50 may continue developing an alternating-voltage as represented by a broken line in FIG. 2, which is then supplied through a rectifier 42 and a coil 46 to energize the actuator 9. As the variable-voltage winding 56 has no switching means, the generated voltage will be varied by the angular movement of the annular member 7, depending on the rpm of the rotor 3.

With the magnetic flux control means in which the annular member 7 is moved circumferentially by means of the actuator 9 energized in accordance with instructions issued out of the controller 10, the annular member 7 is allowed to move into any of more than one angular position; a first position where any magnetic flux permeable piece 17 of the annular member 7 comes in alignment with any slot 22 in the stator core 15 as shown in FIGS. 4 and 6(I) and a second position where any magnetic flux permeable piece 17 of the annular member 7 comes in alignment with any tooth 20 in the stator core 15 as shown in FIGS. 5 and 6(II). Whenever the annular member comes into the position as shown in FIGS. 5 and 6(II), where any magnetic flux permeable piece 17 of the annular member 7 is place in radial alignment with any tooth 20 in the stator core 15 while any nonmagnetic pieces 18 of the annular member 7 comes into radial alignment with any slot 22 in the stator core 15, the magnetic force coming from the permanent-magnet member 5 passes through the magnetic flux permeable pieces 17 of the annular member 7 and then the teeth 20 in the stator core 15 to drive the rotor 3. As opposed to the above, whenever annular member comes into the position as shown in FIGS. 4 and 6(I), where any magnetic flux permeable piece 17 of the annular member 7 is placed between any two adjacent teeth 20 in the stator core 15, with bridging any clearance between the two adjacent teeth 20, the magnetic flux coming from the permanent-magnet member 5 is restricted.

Both the magnetic flux permeable piece 17 and the nonmagnetic piece 18 of the annular member 7 may be determined in their circumferential size with respect to the clearance in the stator core 15, for example in such a relation that the magnetic flux coming from the permanent-magnet member 5 and entering the teeth 20 in the stator core 15 through the nonmagnetic pieces 18 of the annular member 7 is almost equivalent in flux density with the magnetic flux coming from the permanent-magnet member 5 and entering the teeth 20 in the stator core 15 through the magnetic flux permeable pieces 17. Thus, when the actuator 9 moves the annular member 7 relatively to the stator 4 into any angular position where any magnetic flux permeable piece 17 of the annular member 7 is brought into alignment with any associated tooth 20 in the stator core 15, the magnetic force coming from the permanent-magnet member 5 and entering the teeth 20 in the stator core 15 through the magnetic flux permeable pieces 17 of the annular member 7 of the annular member 7 is allowed to shift circumferentially with uniformity. Once the rotor 3 is running, the annular member 7 is kept in the position where any magnetic flux permeable piece 17 comes into a position corresponding to any associated tooth 20 in the stator core 15 as seen from FIGS. 4 and 6(II). In contrast, when the rotor 3 comes to rest, any magnetic flux permeable piece 17 of the annular member 7 is placed facing with any associated clearance, or slot 22, between any adjacent teeth 20 in the stator core 15 so that the magnetic flux coming from the permanent-magnet member 5 and entering the teeth 20 in the stator core 15 is restricted to pass circumferentially of the annular member 7 with uniform distribution.

The permanent-magnet member 5 is formed in overall cylindrical configuration, and composed of more than one permanent-magnet piece 35 arranged circumferentially in juxtaposition and nonmagnetic piece 21 of vitreous material each interposed between any two adjacent permanent-magnet pieces 35. The permanent-magnet piece 35 is of a radially directed magnet in which any one of unlike poles; N-and S-poles is radially inside the rotor 3 and another pole is outside the rotor 3. Moreover, it is to be noted that the radially directed permanent-magnet pieces 35 are arranged in such a way that poles on either piece alternate in polarity (north, south, north, south) circularly around the rotor 3. The reinforcing member 16 may be made of, for example carbon fibers or ceramics fibers having no magnetism, which are molded with resinous material. As an alternative, the reinforcing member 16 may be made of either reinforcing filaments of ceramics and/or alloys or reinforcing cylinders of amorphous alloys, which are coated with vitreous material then, followed by winding around the outside periphery of the permanent-magnet member 5 at any elevated temperature to joint together the reinforcing filaments or cylinders with vitreous material.

Referring next to FIGS. 7 to 14, there is shown a second embodiment of the magnetic flux control means for the motor-generator in accordance with the present invention. Most of components and parts of the second embodiment are the same as previously described in the first embodiment stated earlier. To that extent, the components and parts have been given the same reference characters affixed with "a", so that the previous description will be applicable.

Figure 10:
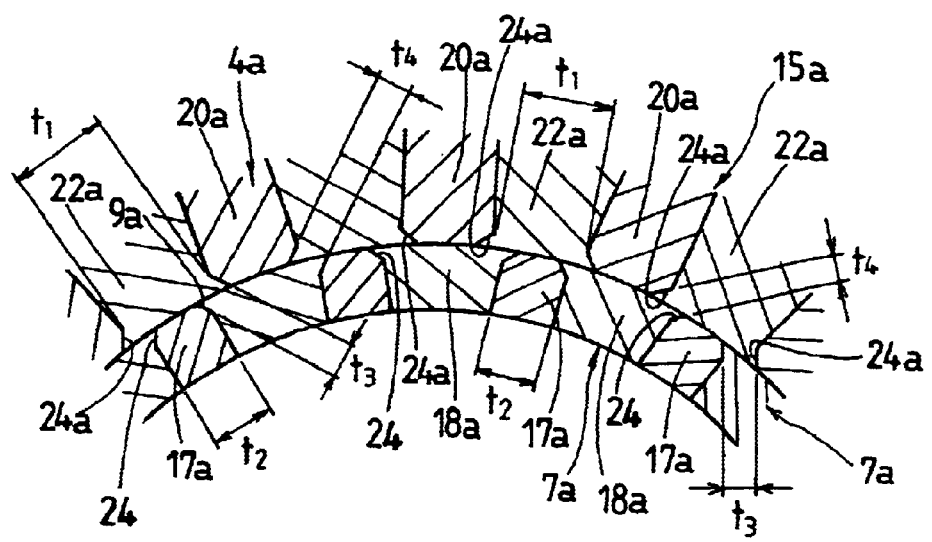
FIG. 10 is a fragmentary enlarged section explaining a positional relation between a stator and an annular member.

The magnetic flux control means according to the second embodiment, as shown in particular in FIG. 10, is characterized by the distinctive form in the annular member 7 and corresponding shape of the tooth 20a in the stator core 15a. The annular member 7a is comprised of more than one magnetic flux permeable piece 17a of rectangle in cross section arranged circumferentially in the form of cylinder with nonmagnetic pieces 18a being each interposed between any two adjacent magnetic flux permeable pieces 17a. Any magnetic flux permeable piece 17a has a circumferential width $t_2$ made less than a circumferential width $t_1$ of any slot 22a in the stator core 15a of the stator 4a: $t_1 > t_2$. Moreover, the magnetic flux permeable piece 17a is chamfered off at radially outside corners, called first chamfer 24, of the rectangle viewed in cross section. Thus, when the annular member 7 is placed at the angular position where any magnetic flux permeable piece 17a comes into radial alignment with any slot 22a, there is provided any preselected clearances $t_3$ and $t_4$, called first clearance between any first chamfer 24 and any associated radially inside corner of the tooth 20a in the stator core 15a. The annular member 7a, when being moved circumferentially by the driving means of the actuator 9a, is controlled in a manner to make any one $t_3$ of the clearances $t_3$ and $t_4$ ahead of any magnetic flux permeable pieces 17a almost equal in amount to another clearance $t_4$ behind the magnetic flux permeable piece 17a: $t_3 = t_4$. The tooth 20a in the stator core 15a is also chamfered off at its tooth tip corners called second chamfer 24a.

The annular member 7a fits in the stator 4a for rotation relative to the stator 4a with the outside periphery thereof keeping the close sliding contact with the tooth tips of the teeth 20a in the stator 4a. Thus, the actuator 9a forces the annular member 7a to rotate in increments with respect to the stator 4a, changing the angular position of the annular member 7a relatively to the stator 4a to vary the. magnetic flux passing through the tooth 20a, eventually controlling the produced electric power. The clearances $t_3$, $t_4$ between any chamfered chamfers 24 on the magnetic flux permeable piece 17a in the annular member 7a and the associated confronting chamfer 24a on the tooth 20a in the stator core 15a are varied in traverse distance as the actuator 9a moves the magnetic flux permeable piece 17a in increments with respect to the opposing tooth 20a in the stator core 15a.

Figure 11:
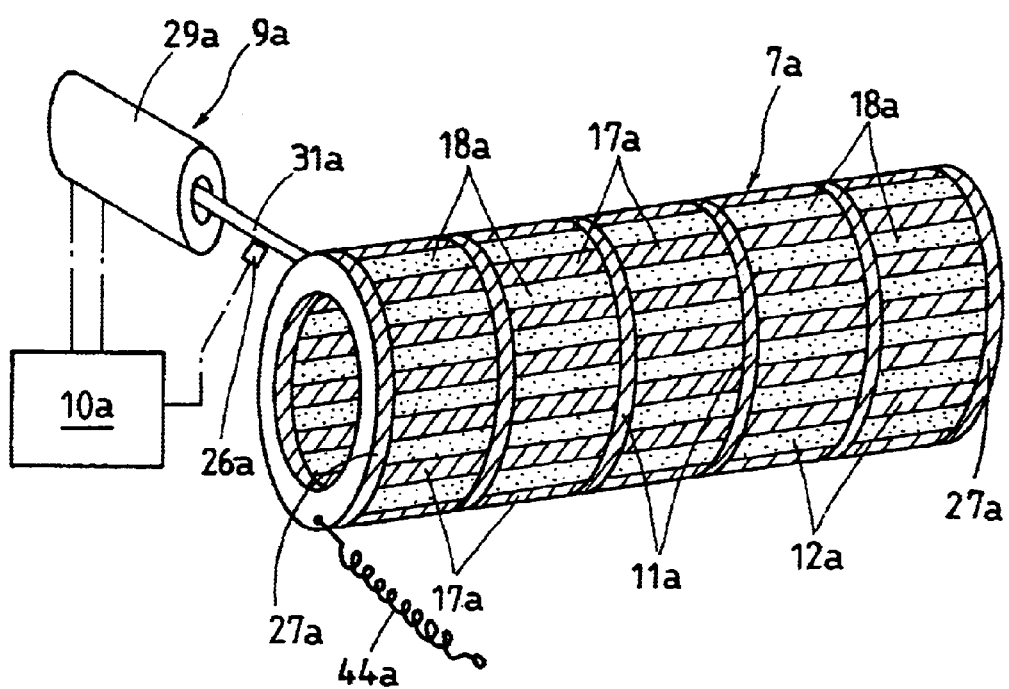
FIG. 11 is a schematic view explaining an actuator to move angularly the annular member.

The annular member 7a, for example as shown in FIG. 11, may be comprised of magnetic flux permeable rings ha and magnetic flux permeable/nonmagnetic sets 12a, which are arranged in a manner to alternate lengthwise each other. The magnetic flux permeable rings are each made of magnetic flux permeable materials laminated circumferentially in a rich density while the magnetic flux permeable/nonmagnetic sets 12a are each composed of arced magnetic flux permeable pieces 17a arranged circumferentially apart from each other with nonmagnetic pieces 18a being each interposed between any adjacent magnetic flux permeable pieces 17a. The nonmagnetic piece 18a may be either replaced with air or made of any reinforcing member of aluminum, resinous material and so on. The magnetic flux permeable pieces 17a are each roughly equal in axial length with the tooth 20a in the stator core 4a and also the number of the magnetic flux permeable pieces 17a is equal the number of the stator teeth 20a. Moreover, the magnetic flux permeable rings 11a are each made of silicon-steel plates and ring members laminated alternately and jointed together in the axial direction of the annular member 7a. As an alternative, the magnetic flux permeable/nonmagnetic set 12a in the annular member 7a may be made in a construction in which a magnetic flux permeable steel ring is provided with windows positioned at equal intervals around the circular surface, and nonmagnetic reinforcing materials fit in the windows.

The actuator 9a, for example as shown in FIG. 11, includes a solenoid-operated valve 29a having a connecting rod 31a fixed to any axial end of the annular member 7a. A controller 10a moves the connecting rod 31a of the solenoid-operated valve 29a to rotate in increments the annular member 7a to any angular position selected out of more than one position of the annular member 7 by the use of a position sensor 26a. With the actuator 9a in which the connecting rod 31a is connected at opposing ends thereof to the solenoid-operated valve 29a and any axial end of the annular member 7a, controlling a current in a coil of the solenoid-operated valve 29a causes the connecting rod 31a to move in and out, thereby rotating the annular member 7 in increments, either clockwise or counterclockwise, so that the magnetic flux permeable piece 17a and nonmagnetic piece 18a are displaced in angular position with respect to the associated tooth 20a in the stator 4a. Thus, the actuator 9a will vary the voltage loaded on the solenoid-operated valve 29a, for example depending on the position of the connecting rod 31a monitored by the position sensor 26a. With the solenoid-operated valve 29a being applied with a large voltage, for example, the annular member 7a is driven to move circumferentially. As the voltage is reduced, the annular member 7a will come to rest at the desired position. Moreover, the annular member 7a is provided with a return spring 44a to make it easy to keep the annular member 7a at any desired position. Besides, the annular member 7a is provided at axially opposing ends thereof with outer rings 27a, each to each end, to keep the magnetic force against leaking out from the axially opposing ends.

Figure 12:
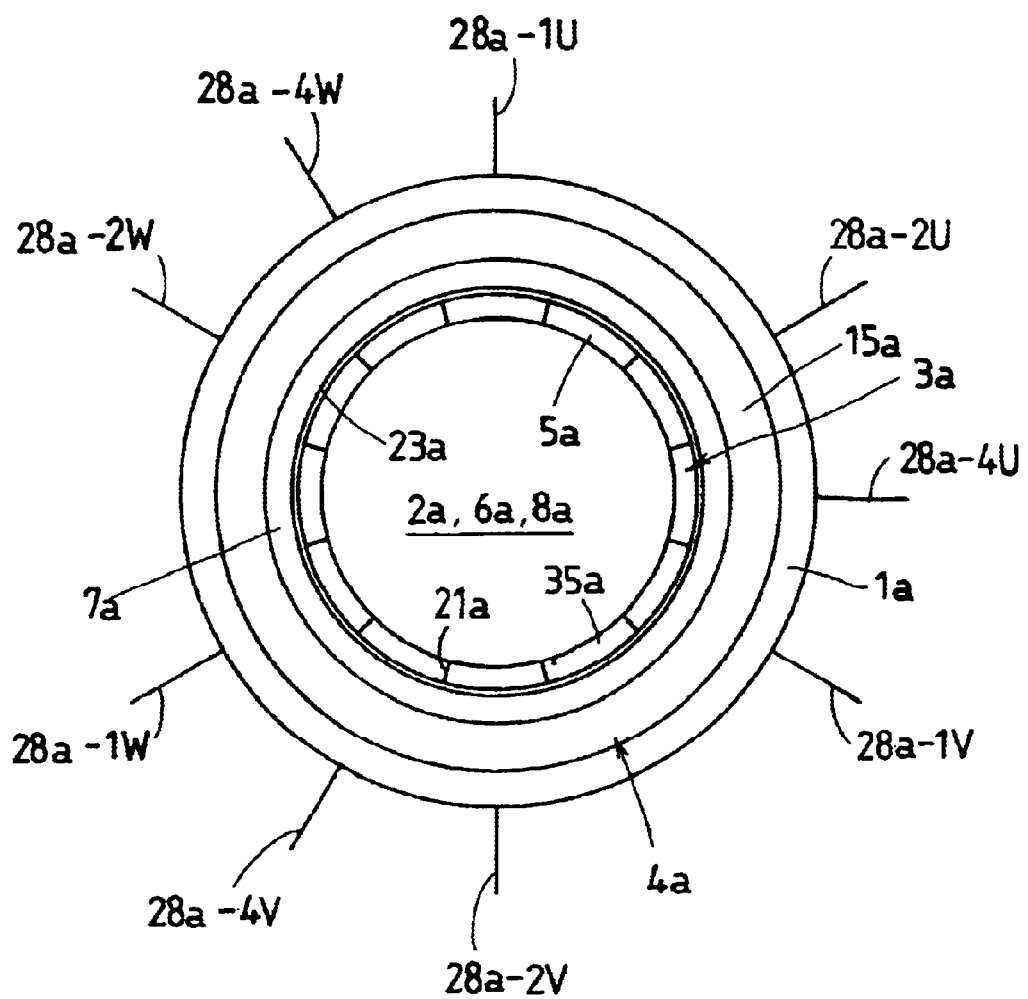
FIG. 12 is an illustration to explain wirings led out of the motor-generator.

Windings 14a laid in sequential slots 22a of the stator 4a are wound on the teeth 20a of the stator core 15a in the stator 4a so as to generate electricity in phase, and also grouped into more than one winding sets to be connected in series to provide loops or turns different in number. In FIG. 12, the windings 14 are grouped into, for example three winding sets 1U-1V-1W, 2U-2V-2W and 4U-4V-4W in FIG. 12, any two winding sets 1U-1V-1W and 2U-2V-2W of which are connected with each other while the residual winding set and 4U-4V-4W is used for other output. Although not shown, in some events, the windings may be grouped into three winding sets 1U-2V-3W, 2U-2V-2W and 3U-3V-3W.

Figure 13:
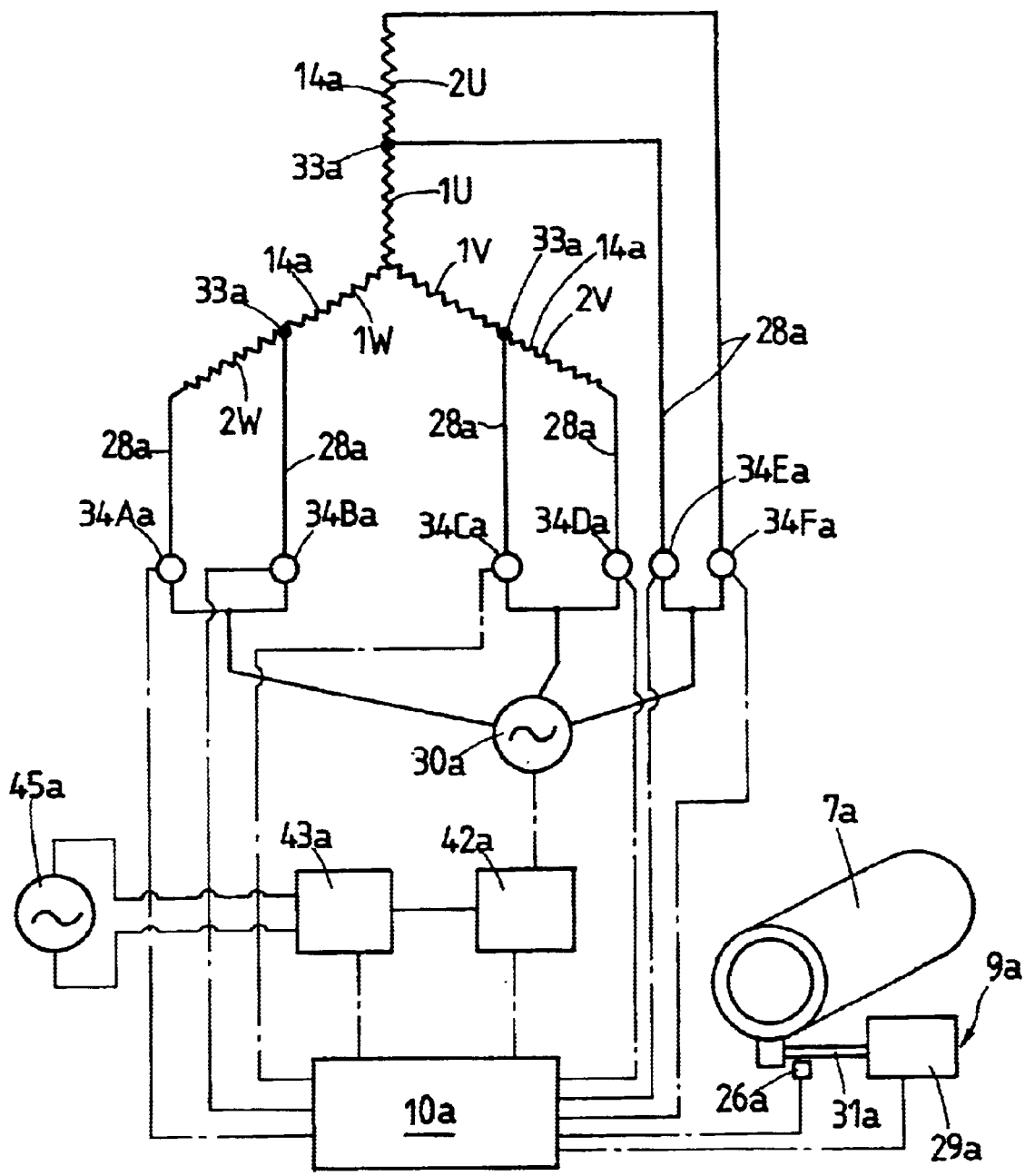
FIG. 13 is a wiring diagram showing an example of a winding connection of three-phase a-c system in the motor-generator.

The controller 10a, as seen from FIG. 13, has a rectifier 42a to rectify the output power of the desired voltage to a d-c, and also inverter 43a to convert the output power of the desired voltage to an a-c 45a of for example 100V and 50~60 Hz. In the windings 14a to create a three-phase current, subdivided windings 1U and 2U, subdivided windings 1V fair and 2V and subdivided windings 1W and 2W are each connected in series at the connection points 33a that are connected through lines 28a to switches 34a (34Aa, 34Ba, 34Ca, 34Da, 34Ea and 34Fa). Thus, the controller 10a in response to the rpm of the rotor 3a, controls the on-off operation of the switches 34a to connect more than one winding set either in parallel or in series with each other and further controls the angular position of the annular member 7a relative to the stator 4a, thereby give a three-phase a-c power supply 30a of a desired alternating-voltage.

For example, when the controller 10a turns on the switch 34Ba, switch 34Ca and switch 34Ea, while turns off the residual switches, all winding sets are left unconnected from each other thereby giving the corresponding output voltage. When the switch 34Aa, switch 34Da and switch 34Fa are turned on while other switches are turned off, any two winding sets come into series connection, thus producing another corresponding voltage. Accordingly, the controller 10a governs the on-off operation of the switching means in accordance with the rpm of the rotor 3a, thereby yielding the output voltage (V) of the constant alternating-voltage as shown in FIG. 11. Moreover, the windings 14a on the stator 4a are constituted in phase in matching with the number of poles of permanent magnets on the rotor 3a, while the winding sets 1U-1V-1W and 2U-2V-2W are connected in parallel, thereby providing the generator capable of producing a large current with even low voltage.

Figure 14:
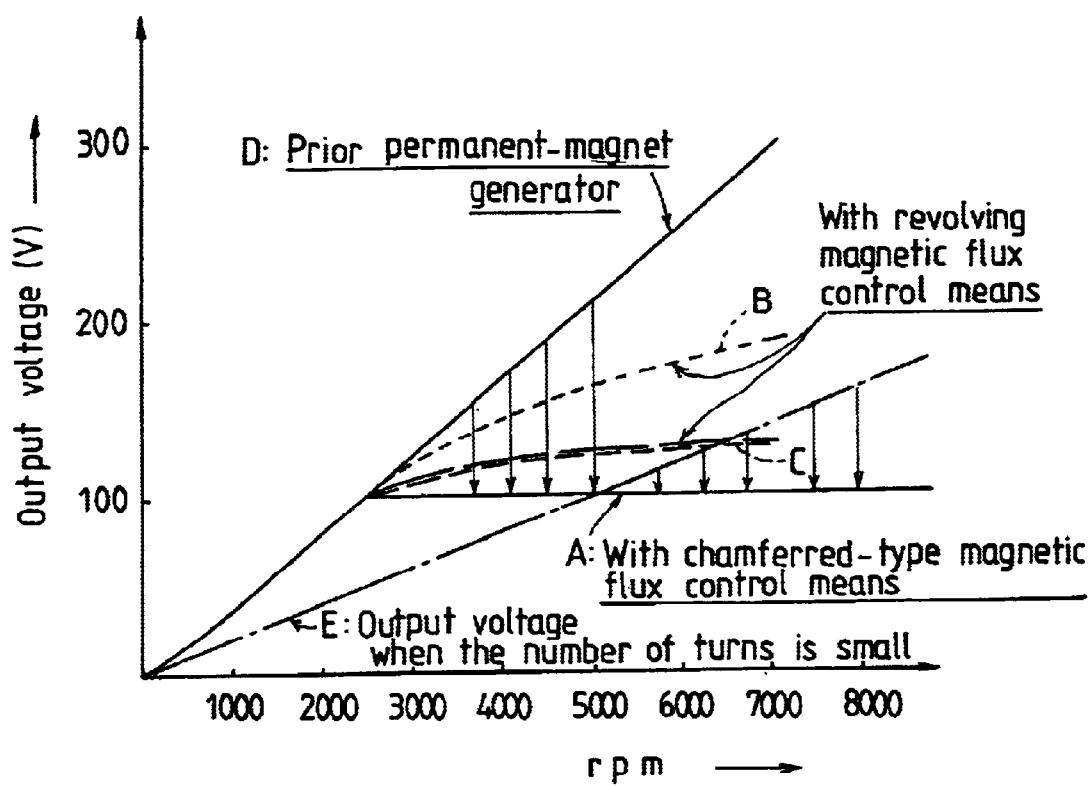
FIG. 14 is a graphic representation showing rpm vs. output voltage produced by the winding connection of the three-phase a-c system.
Figure 15:
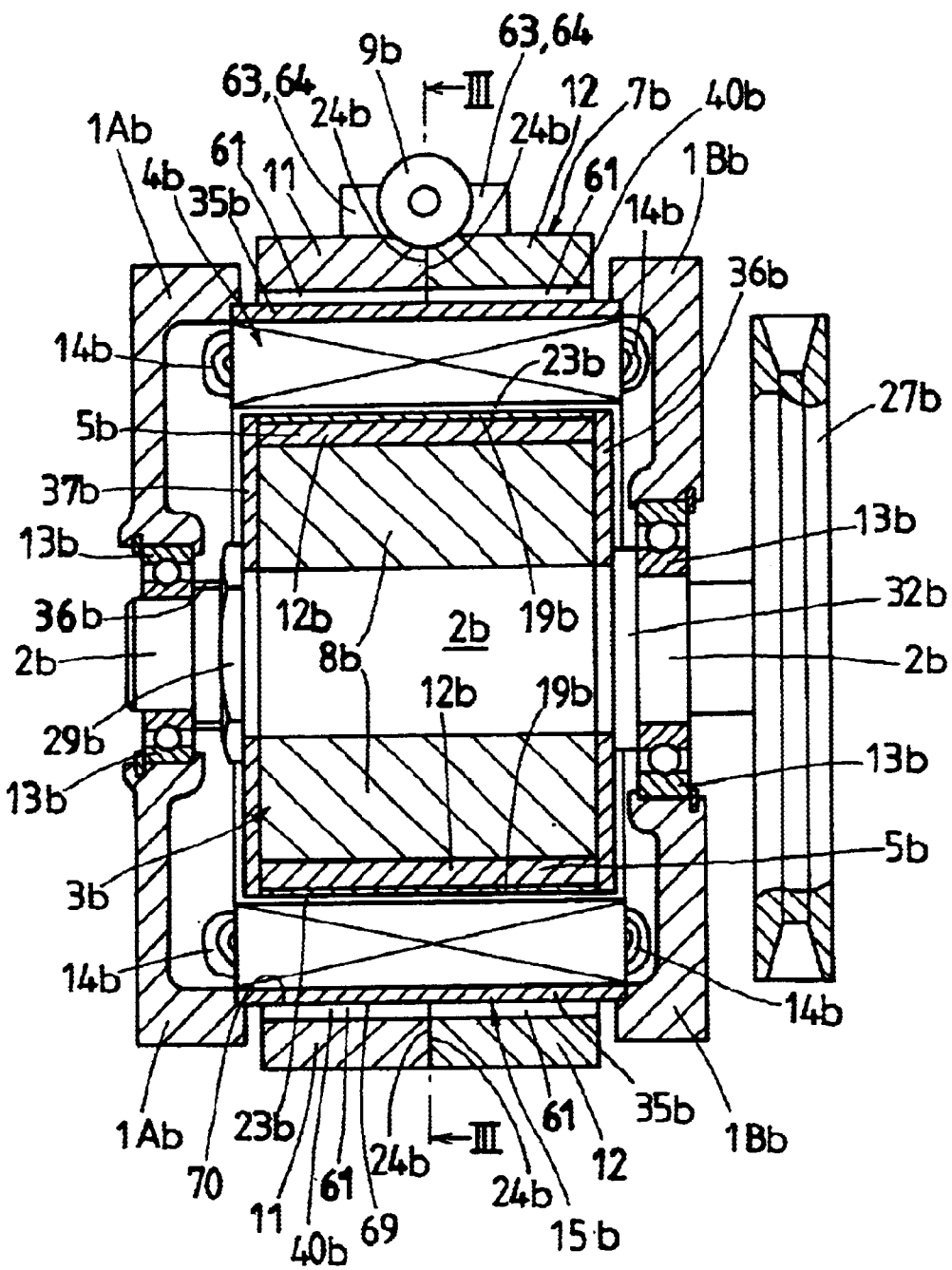
FIG. 15 is an axial section showing a third embodiment of the magnetic flux control means in accordance with the present invention.

As seen from FIG. 10, both the magnetic flux permeable pieces 17a and the teeth 20a in the magnetic flux control means are chamfered at 24 and 24a to help ensuring for generating a constant output voltage, for example the output voltage of 100V. With the prior permanent-magnet generator in which there is no provision of the annular member for flux control between the rotor 3a and the stator 4a, the output voltage rises along a curve D in FIG. 14 to the extent to which the voltage control comes impossible as the rotor 3a is driven with high speed in rpm. In contrast, the magnetic flux control means having the annular member 7a controllable in angular position succeed in lowering the output voltage to any desired constant voltage as shown by downward arrows. With other prior motor-generator having the annular control member arranged between the rotor and the stator, for example disclosed in Published Unexamined Patent Application in Japan No.2000-261 988, it has been possible to produce the output voltage controlled as shown in FIG. 14 with curves B and C. Nevertheless, since the output voltage increases gradually according to the increase of the rotor speed in rpm, it has been very tough to ensure the desired voltage kept constant irrespective of the variation in the rotor speed. Even in an event where the number of turns in the winding is small as shown by a curve E, moreover, any angular movement of the annular member 7a realizes the control of the produced voltage to any desired output voltage as shown by downward arrows when the speed in rpm of the rotor 3a is elevated.

With the motor-generator constructed as stated just earlier, the controller 10a issues any instruction to get the actuator 9a working to move the annular member 7a to either any angular position where any magnetic flux permeable piece 17a comes in alignment with the confronting slot 22a of the stator core 15a at center radial lines of their circumferential widths or any other position where any magnetic flux permeable piece 17a of the annular member 7a comes in alignment with the confronting tooth 20a of the stator core 15a at center radial lines of their circumferential widths. When the annular member 7a is brought into an angular position shown in FIG. 8, where any magnetic flux permeable piece 17a of the annular member 7a comes in alignment with the associated tooth 20a of the stator core 15a at center radial lines of their circumferential widths while any nonmagnetic piece 18a of the annular member 7a is in alignment with the associated slot 22a in the stator core 15a on their widthwise center radial lines, the magnetic force is allowed to pass coming from and entering the permanent-magnet members 5a through the magnetic flux permeable pieces 17a of the annular member 7a and the teeth 20a in the stator core 15a, thereby rotating the rotor 3a. In contrast, when the annular member 7a moves to another position shown in FIG. 9, where any magnetic flux permeable piece 17a of the annular member 7a is placed between any two adjacent teeth 20a in the stator core 15a or in circumferential alignment with any clearance between the adjacent teeth 20a in the stator core 15a, the magnetic flux passing through there is subject to restriction.

Figure 9:
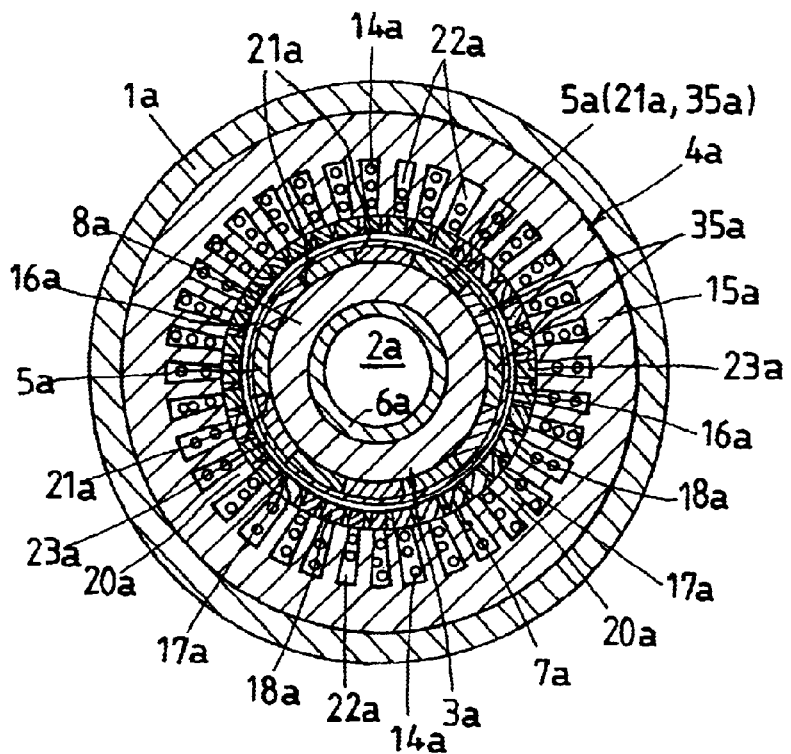
FIG. 9 is a cross-sectional view of the magnetic flux control means of FIG. 7 taken on the plane II—II of that figure, wherein an annular member is moved to an angular position where magnetic flux is restricted.

Both the permeable piece 17a and the nonmagnetic piece 18a are each determined in circumferential or widthwise size with respect to the clearance in the stator core 15a in such a manner that the magnetic flux coming from the permanent-magnet member 5a and entering the teeth 20a in the stator core 15a through any nonmagnetic piece 18a of the annular member 7a is roughly equivalent in magnetic flux density to the magnetic flux coming from the permanent-magnet member 5a and entering the teeth 20a in the stator core 15a through any magnetic flux permeable piece 7a of the annular member 7a. Thus, when the actuator 9a urges the annular member 7a to move into any angular position where any magnetic flux permeable piece 17a of the annular member 7a comes in alignment with any associated tooth 20a in the stator core 15a, the magnetic force coming from the permanent-magnet member 5a and entering the teeth 20a in the stator core 15a through the magnetic flux permeable pieces 17a of the annular member 7a may shift circumferentially with uniformity. In the motor-generator having the magnetic flux control means constructed as stated above, once the rotor 3a is running, the annular member 7a is kept in the position shown in FIG. 8, where any magnetic flux permeable piece 17a comes into radial opposition to any associated tooth 20a in the stator core 15a. In contrast, when the rotor 3 comes to rest, any magnetic flux permeable piece 17a of the annular member 7a is placed as shown in FIG. 9, with any clearances $t_3$, $t_4$ remaining between the widthwise ends of the magnetic flux permeable piece 17a and the adjacent teeth 20a in the stator core 15a, so that the magnetic flux coming from the permanent-magnet member 5a and entering the teeth 20a in the stator core 15 is restricted to pass circumferentially of the annular member 7 with uniform distribution.

Next, a third embodiment of the magnetic flux control means for the permanent-magnet motor-generator according to the present invention will be explained hereinafter with reference to FIGS. 15 to 21. Most of components and parts of the third embodiment are the same as previously described in the first embodiment stated earlier. To that extent, the components and parts have been given the same reference characters affixed with "b", so that the previous description will be applicable.

The third embodiment is characterized by a construction in which an annular member 7b to control the magnetic flux passing through a stator 4b is arranged surrounding around the outside periphery of the stator 4b. The annular member 7b is arranged for relative rotation with respect to the stator 4b and provided along the inside periphery thereof with axial ribs 67, the inside tips of which form curved parts of the inner peripheral surface 70 of circular shape in cross section. The annular member 7b is connected with an actuator 9b for the driving means to move the annular member 7b relatively to the stator 4b. The annular member 7b is made on the inner peripheral surface 70 with magnetic flux control grooves 61, which are extended axially of the stator 4b and spaced apart away from each other at regular intervals around the curved inner surface 70. Any rib 67 separating the two adjacent grooves 61 comes into close sliding contact with an outside peripheral surface 69 of the stator 4b.

Moreover, the grooves 61 made in the annular member 7b are each roughly equal in circumferential width with the tooth 20b in the stator core 4b. An outside peripheral magnetic path 73 in a stator core 15b of the stator 4b is made less in width by a width of a magnetic path in the annular member 7b. With the magnetic flux control means according to the third embodiment stated just above, when any groove 61 in the annular member 7b comes in radial alignment with any tooth 20b in the stator core 15b, the magnetic flux passing through the tooth 20b is restricted. In contrast, when the any rib 67 in the annular member 7b is brought in radial alignment with any tooth 20b in the stator core 15b, the magnetic flux passing through the tooth 20b increases. Thus, the width of the peripheral magnetic path 73 in the stator core 15b serves to regulate the degree of restriction of the magnetic flux coming from the teeth 20b and entering the annular member 7b through the peripheral magnetic path 73. As an alternative, the grooves 61 in the annular member 7b are filled with nonmagnetic solid lubricant 40b to reduce the frictional resistance that is encountered when the annular member 7b slides over the stator core 15b. Slots 22b in the stator core 15b are also charged with resinous strengthening material to improve stiffness of the stator 4b.

The annular member 7b in the third embodiment is composed of a pair of annular halves 11, 12, which are equal in axial length. The annular halves 11, 12 are jointed together so as to move circumferentially in directions opposite to each other by the action of the actuator 9b. Circumferential movement in opposite directions of the annular halves 11, 12 may compensate for a return force occurring when the magnetic flux is bent, thereby rendering the angular movement of the annular member 7b smooth and easy. The actuator 9b is a reversible motor that has a reversible rotary shaft 41b around which a clockwise external thread 65 and a counterclockwise external thread 66 are provided in a relation spaced axially apart from each other. On the annular halves 11, 12 there are fixed nuts 63, 64, which have a clockwise internal thread and a counterclockwise internal thread, each to each nut, so as to mate the external threads 65, 66 around the rotary shaft 41b, respectively. Thus, when the actuator 9b gets the rotary shaft 41b working, the clockwise threaded nut 63 and the counterclockwise threaded nut 64 are forced to move in increments in opposite directions to each other along the rotary shaft 41b, thereby moving the annular halves 11, 12 in increments in circumferential directions opposite to each other. In contrast, when the actuator 9b drives the rotary shaft 41b in the direction reverse to the direction stated earlier, both the annular halves 11, 12 are moved in increments towards their earlier positions. A controller 10b responds to any axial displacement of the rotary shaft 41b, which is sensed at a position sensor 26b, and energizes the actuator 9b to control an amount of axial displacement of the rotary shaft 41b. Thus, the actuator 9b forces the annular member 7b to revolve in increments with respect to the stator core 15b. This causes the annular member 7b to shift in angular position relative to the stator core 15b, varying the magnetic flux coming from the teeth 20b and passing through the peripheral magnetic path, to thereby control a produced electric power.

Figure 18:
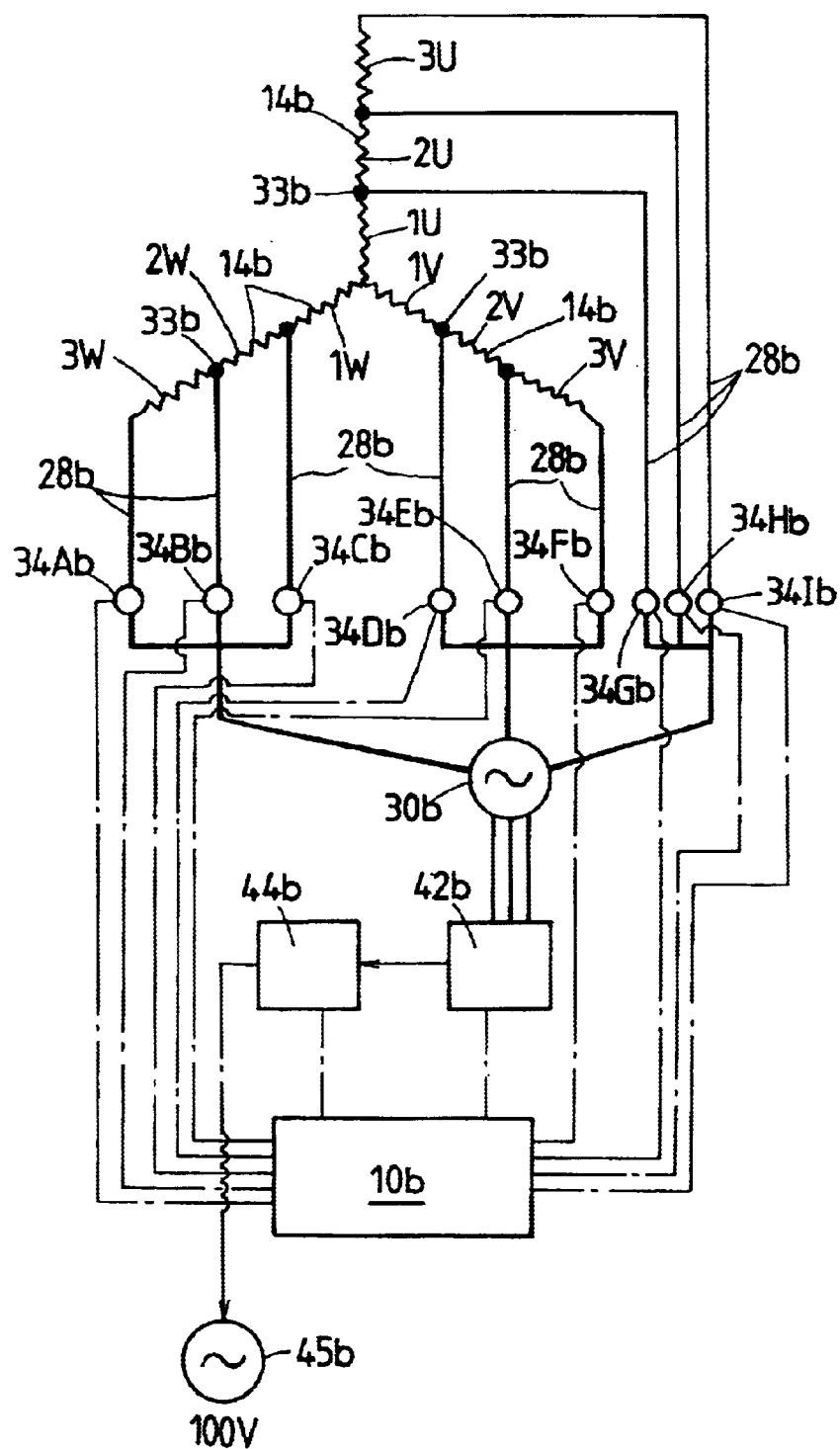
FIG. 18 is a wiring diagram showing another example of the winding connection of three-phase a-c system in the motor-generator.

Windings 14b laid in the sequential slots 22b between the adjacent teeth 20b in the stator core 15b in the third embodiment are grouped into more than one winding set, for example three winding sets 1U-1V-1W, 2U-2V-2W and 3U-3V-3W as shown in FIG. 18, which are different from each other in a number of turns wound on the teeth of the stator core in the stator. There is provided a controller 10b to give a preselected desirable voltage. To this end, the controller 10b in response to the speed in rpm of the rotor 3b serves to control the angular position of the annular member 7b and further to make series and/or parallel connections of the winding sets. The controller 10b connects all the winding sets in series to give a high voltage at the high-tension side, while connects any winding sets in parallel to provide a low voltage with even large in current at the large-current low-tension side. With the windings 14b shunt-wound in the stator core 15b, the high-tension side is output from a conductor of the windings 14b, which is led out on the way and controller 10b serves to reduce the number of turns as the rpm of the rotor 3b increases.

Figure 21:
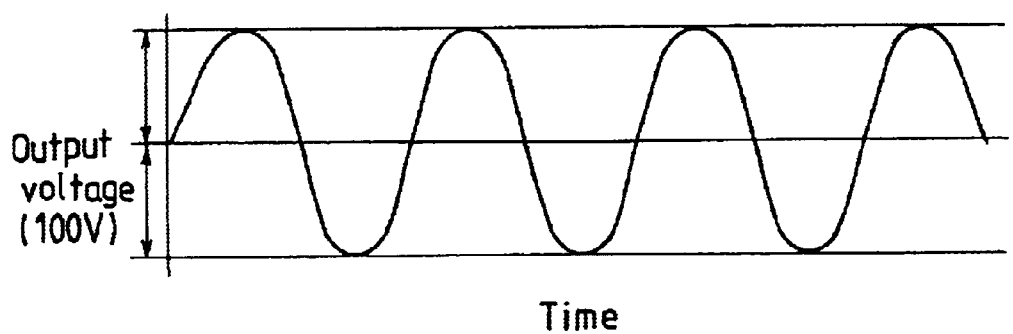
FIG. 21 is a graphic representation explaining an output voltage of alternating current changing with time.
Figure 22:
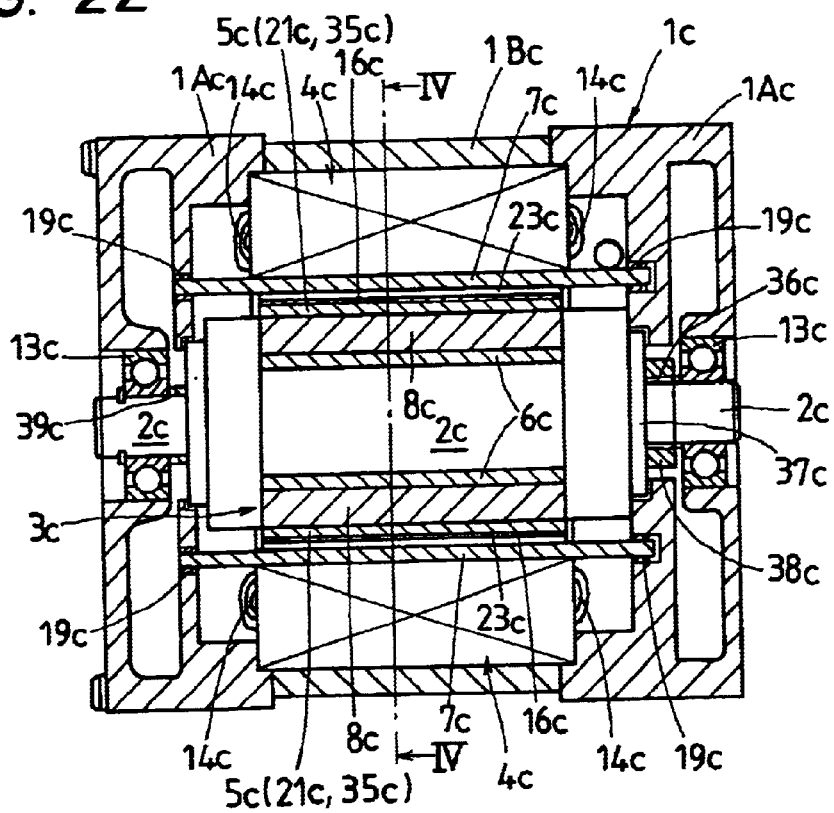
FIG. 22 is an axial section showing a fourth embodiment of the magnetic flux control means in accordance with the present invention.

In the windings 14b constituted as shown in, for example FIG. 18 to create a three-phase current, subdivided windings 1U, 2U and 3U, subdivided windings 1V, 2V and 3V, and subdivided windings 1W, 2W and 3W are each connected in series at the connection points 33b that are connected through lines 28b to switching means 34b (34Ab, 34Bb, 34Cb, 34Db, 34Eb, 34Fb, 34Gb, 34Hb and 34Ib). Thus, the controller 10b in response to the rpm of the rotor 3b, controls the angular position of the annular halves 11, 12 of the annular member 7b with respect to the stator 4b, and further controls the on-off operation of the switches 34b to connect more than one winding set either in parallel or series with each other, thereby giving the three-phase a-c power supply 30b of the preselected desirable alternating-voltage. Besides, the controller 10b, as shown in FIGS. 18 and 21, rectifies at rectifier 42b an electric power of a preselected voltage and then converts at an inverter 44b the rectified electric power into an alternating-voltage 45 of 100V, for example an alternating-voltage of 50~60 Hz.

Figure 20:
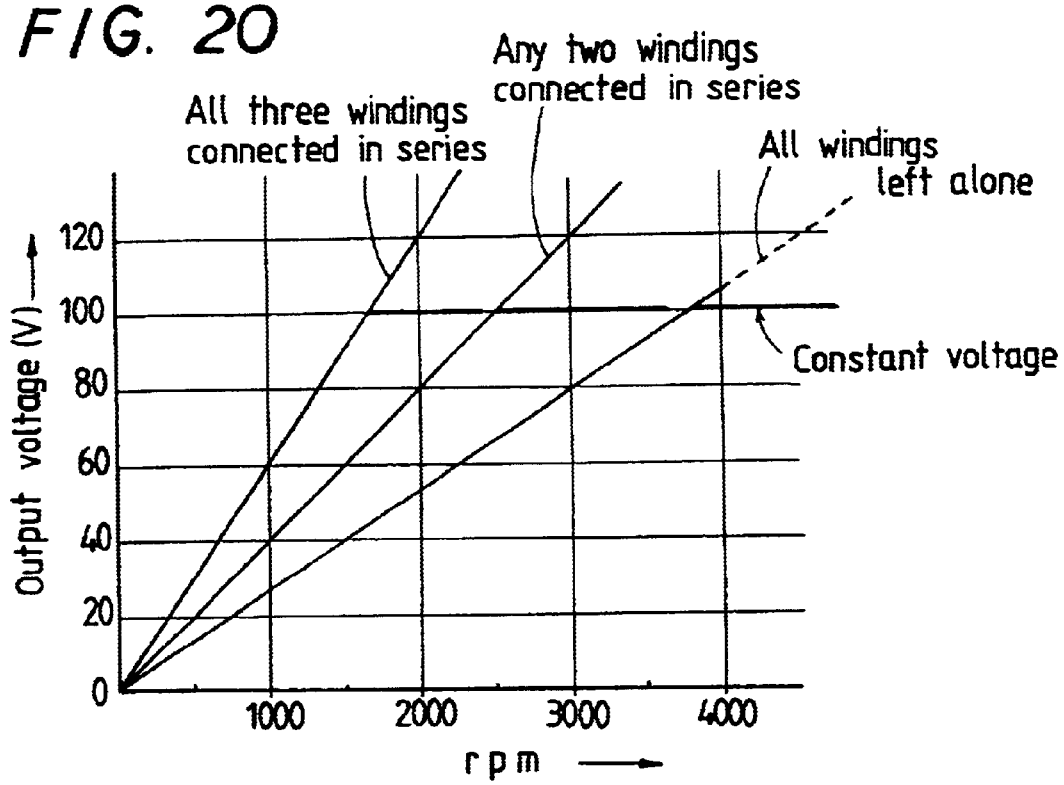
FIG. 20 is a graphic representation showing rpm vs. output voltage produced by the winding connection of the three-phase a-c system.

For example, when the controller 10b turns on the switches 34Cb, 34Db and 34Gb while turns off the residual other switches, all winding are left unconnected alone to give an output voltage shown in FIG. 20. When the switches 34Bb, 34Eb and 34Hb are turned on while other switches are turned off, any two windings come into series connection, thus producing an output voltage shown in FIG. 20. Moreover, when the switches 34Ab, 34Fb and 34Ib are turned on and other switches are turned off, all windings make series connections, thereby producing a corresponding output voltage shown in FIG. 20. Therefore, the controller 10b controls the on-off operation of the switching means 34, depending on the rpm of the rotor 3b, to thereby give the output voltage (V) of any constant voltage as shown in FIG. 20. As an alternative, a low-voltage, large-current generator may be provided in which the windings 14b on the stator 4b are constructed in phase in matching with the number of pole of the permanent magnet on the rotor 3b and the winding sets 1U-1V-1W, 2U-2V-2W and 3U-3V-3W are connected in parallel.

Figure 19:
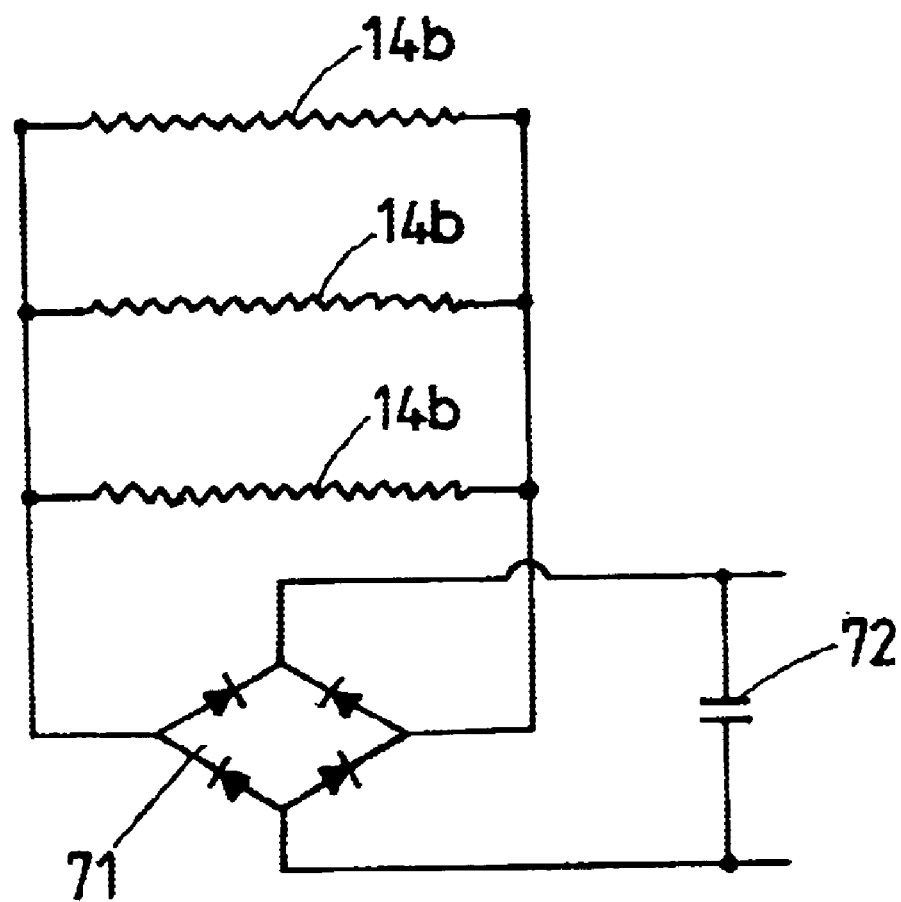
FIG. 19 is a wiring diagram showing an example of a parallel winding connection of three-phase a-c system in the motor-generator.

Moreover, the controller 10b at the low-tension side, as seen in FIG. 19, connects the circumferentially shunt-wound windings 14b in parallel, thus making it possible, with being coupled with the angular position control of the annular member 7b, to give a constant voltage. As seen from FIG. 19, the windings 14b are connected in parallel while the output voltage may be given through a bridge circuit 71 and a condenser 72. As an alternative, in order to produce a low voltage with even large current, the windings 14b on the stator 4b are constructed in phase in matching with the number of pole of the permanent magnet on the rotor 3b while the winding sets are connected in parallel.

Figure 16:
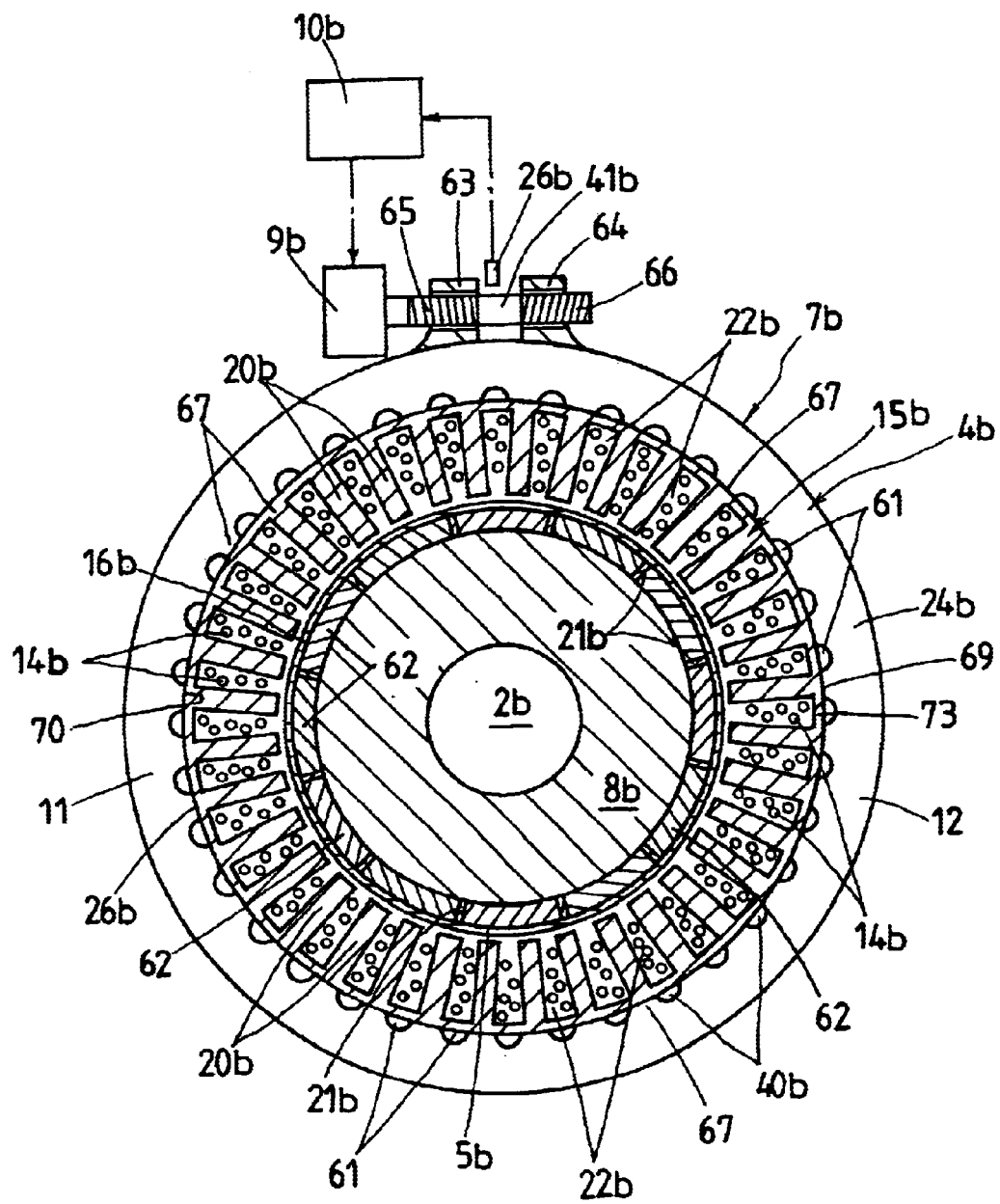
FIG. 16 is a cross-sectional view of the magnetic flux control means of FIG. 15 taken on the plane III—III of that figure, wherein an annular member is moved to an angular position where the magnetic flux is remained unrestricted.
Figure 17:
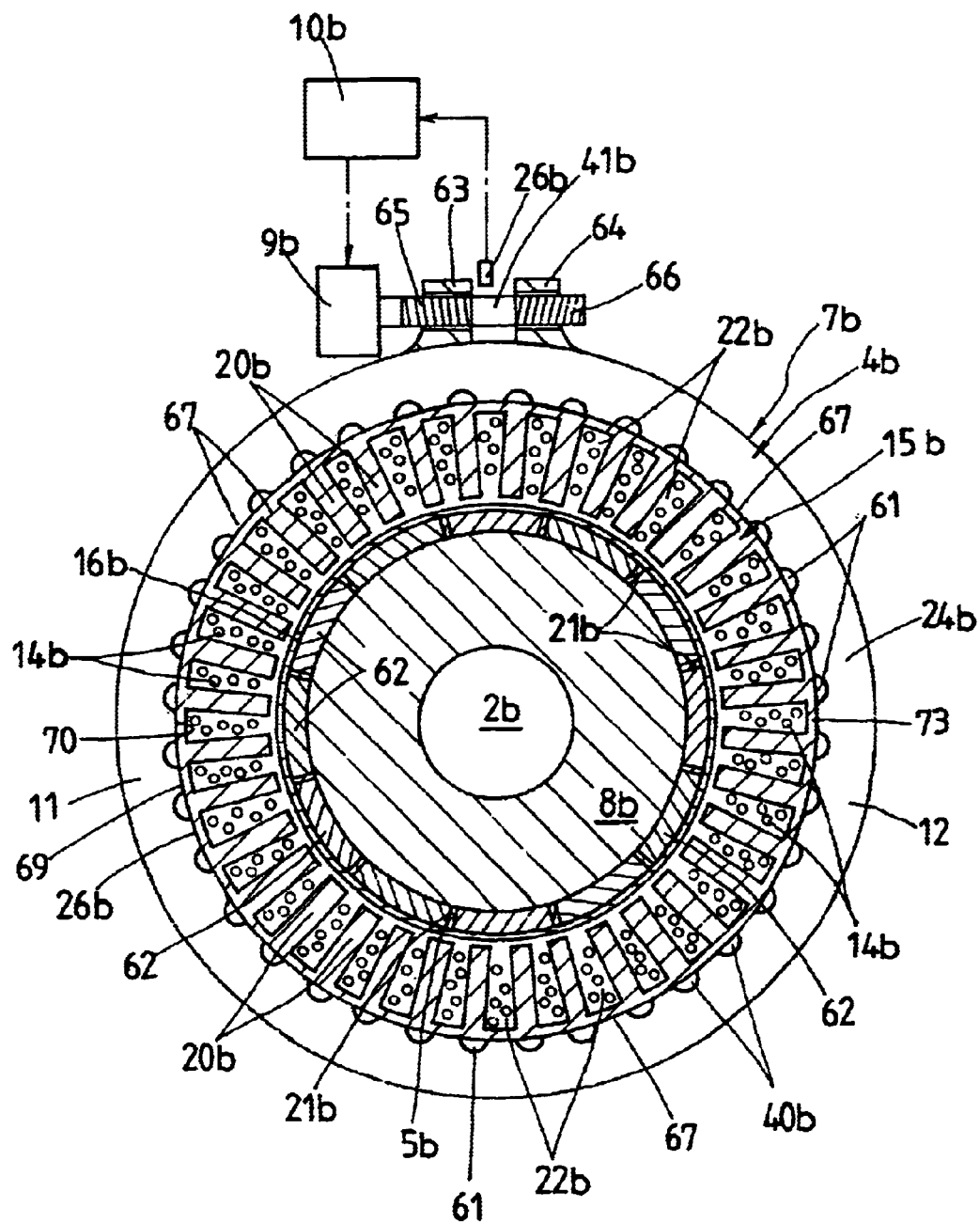
FIG. 17 is a cross-sectional view of the magnetic flux control means of FIG. 15 taken on the plane III—III of that figure, wherein an annular member is moved to another angular position where the magnetic flux is restricted.

With the motor-generator having the magnetic flux control means constructed as stated just above, once the rotor 3b is running, the annular member 7b is kept in the position shown in FIG. 16, where any rib 67 in the annular member 7b comes into radial opposition to any associated tooth 20b in the stator core 15b. In contrast, when the rotor 3b comes to rest, the annular member 7b is brought into any other angular position shown in FIG. 17, where any groove 61 in the annular member 7b is placed between any two adjacent teeth 20b in the stator core 15b, so that the magnetic flux coming from the permanent-magnet member 5b and entering the teeth 20b in the stator core 15b is restricted to pass circumferentially of the annular member 7b with uniform distribution.

Next, a fourth embodiment of the magnetic flux control means for the permanent-magnet motor-generator according to the present invention will be explained hereinafter with reference to FIGS. 22 to 31. Most of components and parts of the third embodiment are the same as previously described in the first embodiment stated earlier. To that extent, the components and parts have been given the same reference characters affixed with "c", so that the previous description will be applicable.

Figure 23:
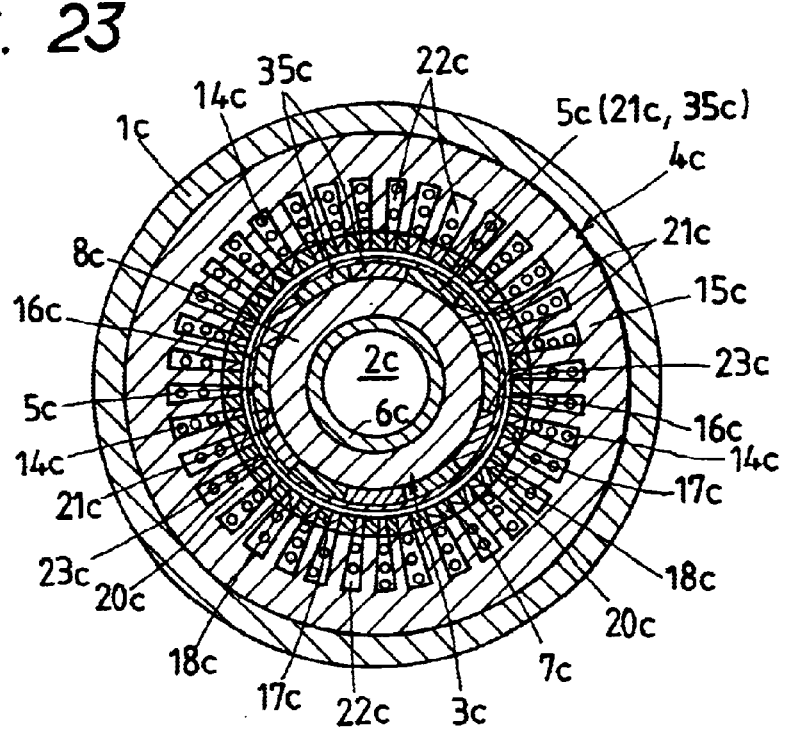
FIG. 23 is a cross-sectional view of the magnetic flux control means of FIG. 22 taken on the plane IV—IV of that figure, wherein an annular member is moved to an angular position where the magnetic flux is remained unrestricted.
Figure 25:
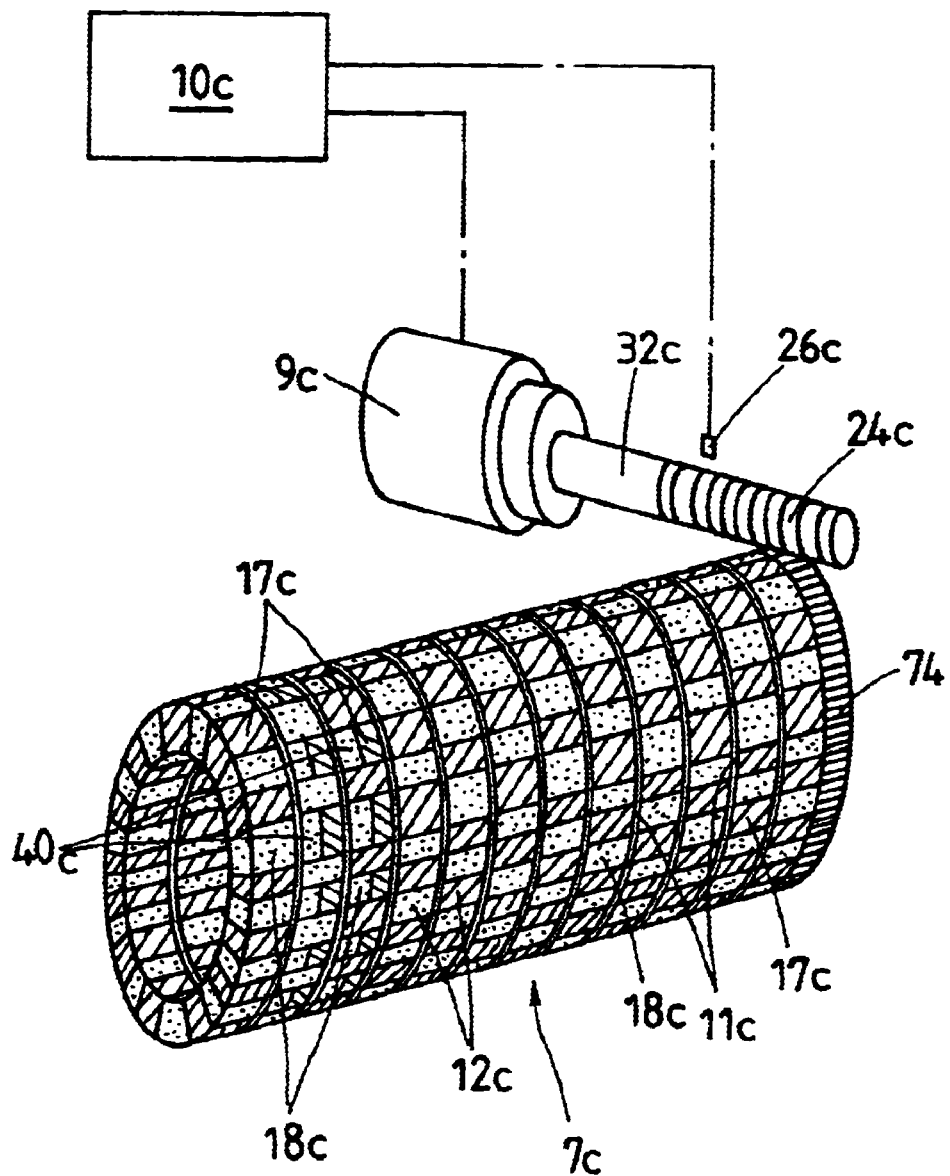
FIG. 25 is a schematic view explaining an example of an actuator to move angularly the annular member.

An annular member 7c in the fourth embodiment shown in FIGS. 23 and 25 is comprised of first magnetic flux permeable parts 11c in which magnetic flux permeable materials are densely laminated in the form of a circle, and second magnetic flux permeable parts 12c in which arced magnetic flux permeable chips 17c are arranged circularly in a manner spaced apart from each other to leave a window open between any two adjacent magnetic flux permeable chips 17c. The first and second magnetic flux permeable parts 11c, 12c unlike in density are arranged alternately along the axial direction of the motor-generator. Nonmagnetic chips 18c of nonmagnetic material such as aluminum and so on are charged in the windows between the adjacent arced magnetic flux permeable chips 17c in the second magnetic flux permeable parts 12c, or density-lean magnetic flux permeable parts, to reinforce in stiffness the density-lean magnetic flux permeable parts. Moreover, the magnetic flux permeable chip 17c has a circumferential width that is roughly equivalent to a length spanning across a tooth 20c in the stator 4c, while the number of the magnetic flux permeable chips per one density-lean magnetic flux permeable part 12c is equal to the number of the teeth 20c in the stator 4c. That is to say, the permeable chip 17c has a circumferential width that is roughly equivalent to a length spanning across a tooth 20c in the stator 4c, whereas the nonmagnetic chip 18c is either identical to or somewhat less in circumferential width than the tooth 20c in the stator 4c. The number of the nonmagnetic chips per one density-lean magnetic flux permeable part 12c is also equal to the number of the teeth 20c in the stator 4c.

As an alternative, the density-lean magnetic flux permeable part 12c in the annular member 7c, as illustrated partly in FIG. 25, is formed in a construction in which annular magnetic flux permeable steel sheets are overlaid axially one on the other, with leaving windows 40c positioned at regular intervals around the curved surface of the annular member 7, the windows 40c being filled with nonmagnetic chips 18c of nonmagnetic material such as aluminum and so on to reinforce in stiffness the density-lean magnetic flux permeable part 12c. The first magnetic flux permeable parts 11c, or density-rich magnetic flux permeable parts, of the annular member 7c are built up of laminations juxtaposed axially, each of which is made of an annular disc and a silicon steel sheet laid one on top of another.

An actuator 9c for the driving means, as shown in FIG. 25, includes a worm wheel 74 formed around an outside periphery of the annular member 7c at any one axial end of annular member 7c, a worm 24c formed on a rotary shaft 32c so as to mate with the worm wheel 74, and a stepping motor mounted on a stator housing 1c. The controller 10c issues any instruction in accordance with the speed in rpm of the rotor 3c to energize the actuator 9c, which moves circumferentially the annular member 7c with respect to the stator 4c to any desired angular position determined with monitoring information of a position sensor 26c. Thus, the annular member 7c is allowed to make unidirectional rotation in increments relatively to the stator 4c when the actuator 9c is energized.

Figure 26:
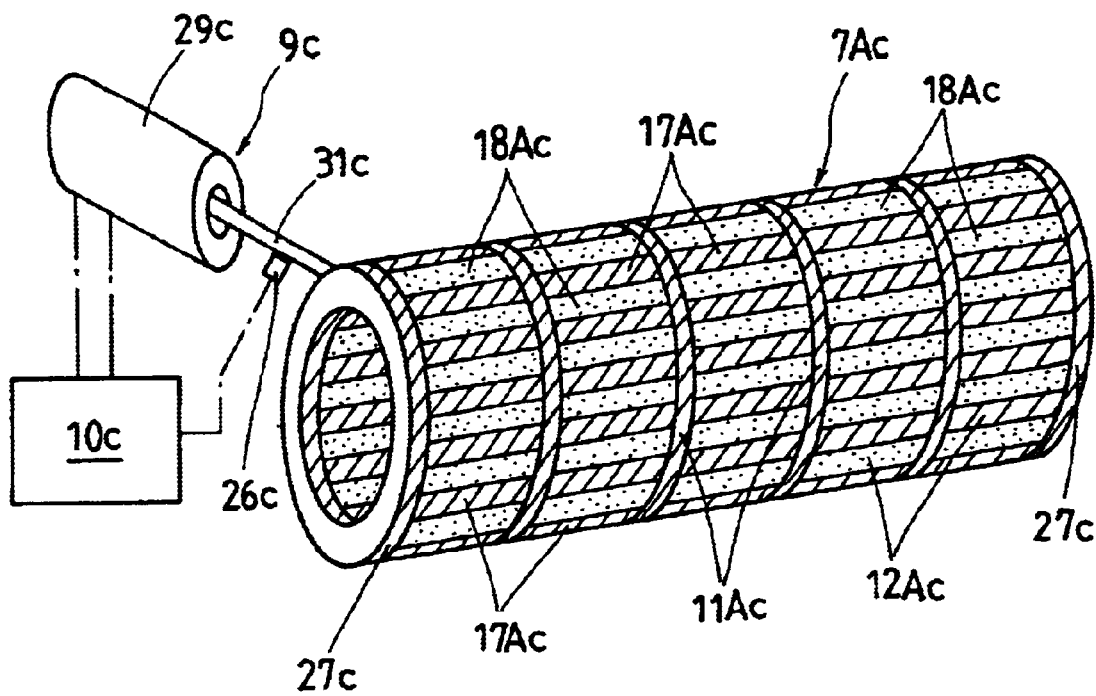
FIG. 26 is a schematic view explaining another example of an actuator to move angularly the annular member.

As an alternative, the actuator 9c as shown in FIG. 26 may be composed of a solenoid-operated valve 29c having a connecting rod 31c fixed to any axial end of an annular member 7Ac. The controller 10c moves the connecting rod 31 of the solenoid-operated valve 29c to rotate in increments the annular member 7Ac to any angular position selected out of more than one position of the annular member 7 by the action of the position sensor 26c. Most of components and parts of the annular member 7Ac shown in FIG. 26 are the same as previously described in the annular member 7c in FIG. 25. To that extent, the components and parts have been given the same reference characters affixed with "A"; density-rich magnetic flux permeable parts 11Ac, density-lean magnetic flux permeable parts 12Ac, magnetic flux permeable chips 17Ac and nonmagnetic reinforcing chips 18Ac, so that the previous description will be applicable. With the actuator 9c in FIG. 26 in which the connecting rod 31c is connected at opposing ends thereof to the solenoid-operated valve 29c and any axial end of the annular member 7Ac, controlling a current in a coil of the solenoid-operated valve 29c causes the connecting rod 31c to move in and out, thereby rotating the annular member 7Ac in increments, either clockwise or counterclockwise, so that the magnetic flux permeable chips 17Ac and nonmagnetic chips 18Ac are displaced in angular position with respect to the associated tooth 20c in the stator 4c. Thus, the actuator 9c will vary the voltage loaded on the solenoid-operated valve 29c, for example depending on the position of the connecting rod 31c monitored by the position sensor 26c. With the solenoid-operated valve 29c being applied with a large voltage, for example, the annular member 7Ac is driven to move circumferentially. As the voltage is reduced, the annular member 7Ac will come to rest at the desired position. Moreover, the annular member 7Ac is provided at axially opposing ends thereof with outer rings 27c, each to each end, to keep the magnetic force against leaking out from the axially opposing ends.

Figure 27:
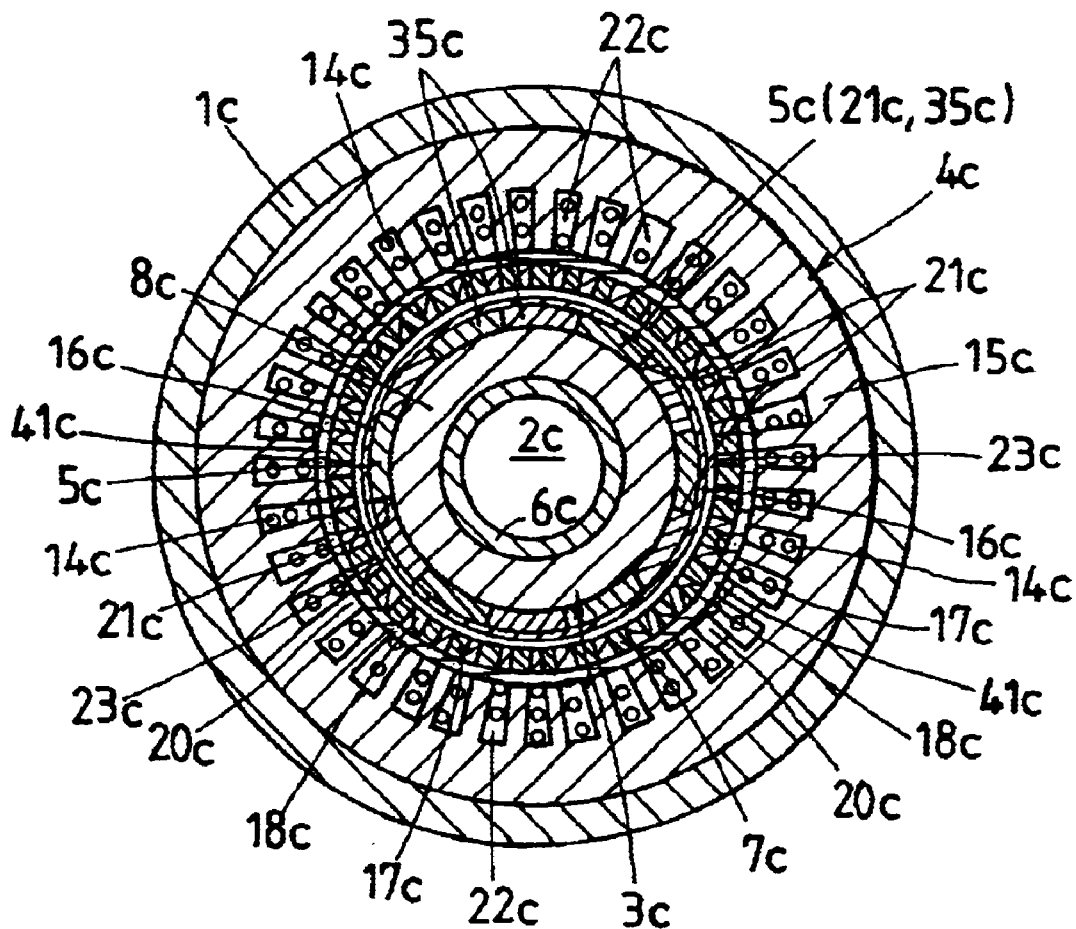
FIG. 27 is a cross-sectional view of a fifth embodiment of the magnetic flux control means for the permanent-magnet motor-generator taken on a plane equivalent to the plane IV—IV of FIG. 22.

Next referring to FIG. 27, there is shown a fifth embodiment of the magnetic flux control means according to the present invention. The fifth embodiment has the same arrangement found in FIG. 23 other than a construction in which a hollow cylinder 41c fits in the stator 4c. The hollow cylinder 41c of thin silicon steel sheet is press-fit inside the tooth tips of the teeth 20c in the stator 4c. The hollow cylinder 41c press-fit inside the teeth 20c renders the inside surface of the stator 4c smooth, helping ensure easy movement of the annular member 7c, so that the controller 10c may provide accurate position control, thus well regulating the magnetic flux. With the hollow cylinder 41c being made of thin silicon steel sheet, since the directional concentration of the magnetic path is oriented radially, the magnetic flux passing circumferentially of the teeth 20c in the stator 4c is relatively sparse and, therefore, has little effect on the magnetic flux control.

Figure 28:
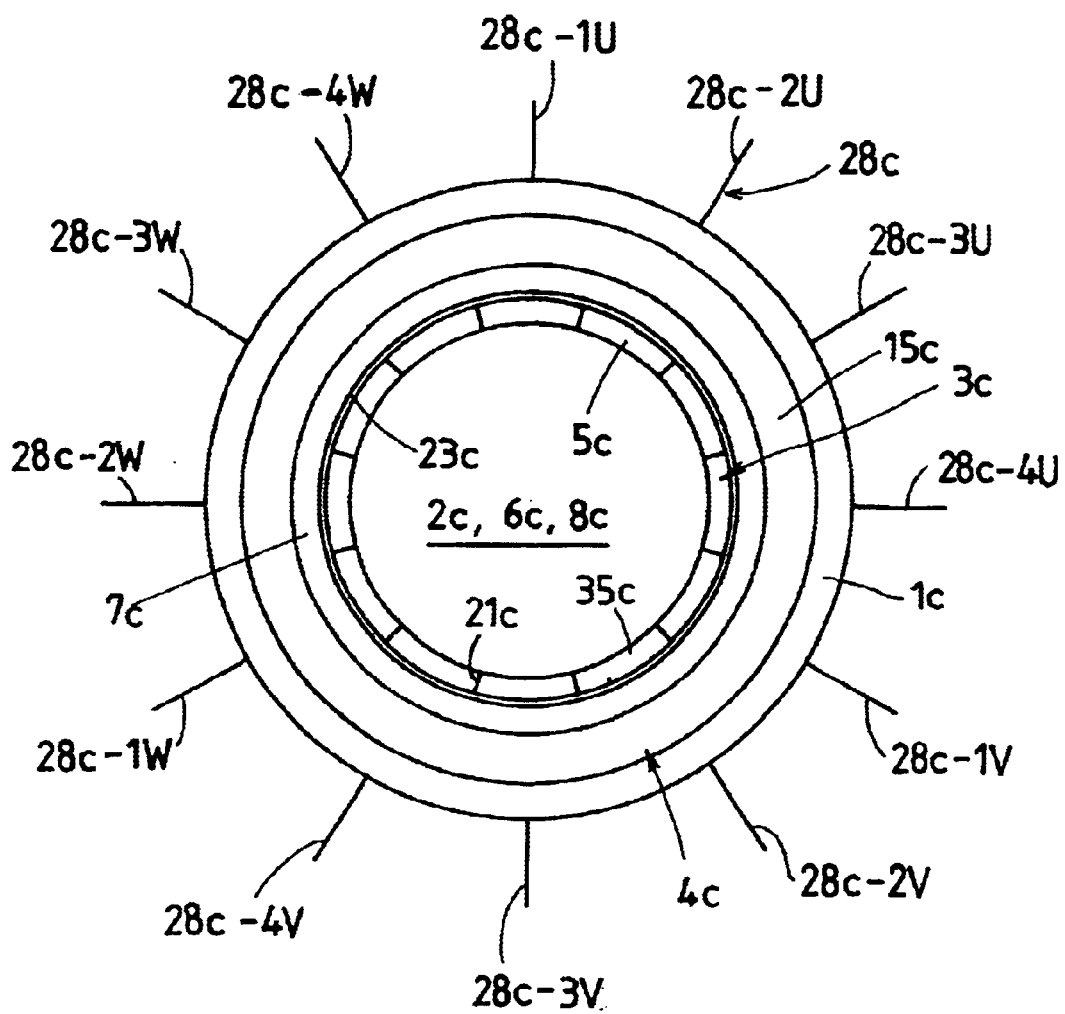
FIG. 28 is an illustration to explain wirings led out of the motor-generator.

The windings 14c laid in the sequential slots 22c of the stator 4c are wound on the teeth 20c of the stator core 15c in the stator 4c so as to generate electricity in phase, and also grouped into more than one winding sets, which may be connected in series with each other to provide loops or turns different in number. In FIG. 28, the windings 14c are grouped into for example, four winding sets 1U-1V-1W, 2U-2V-2W, 3U-3V-3W and 4U-4V-4W, whereas in FIG. 29 they are grouped into three winding sets 1U-1V-1W, 2U-2V-2W and 3U-3V-3W. The controller 10c, as seen from FIGS. 29 and 31, has a rectifier 42c to rectify the output power of the desired voltage to a d-c, and also inverter 43c to convert the output power of the desired voltage to an a-c of for example 100V and 50~60 Hz.

Figure 29:
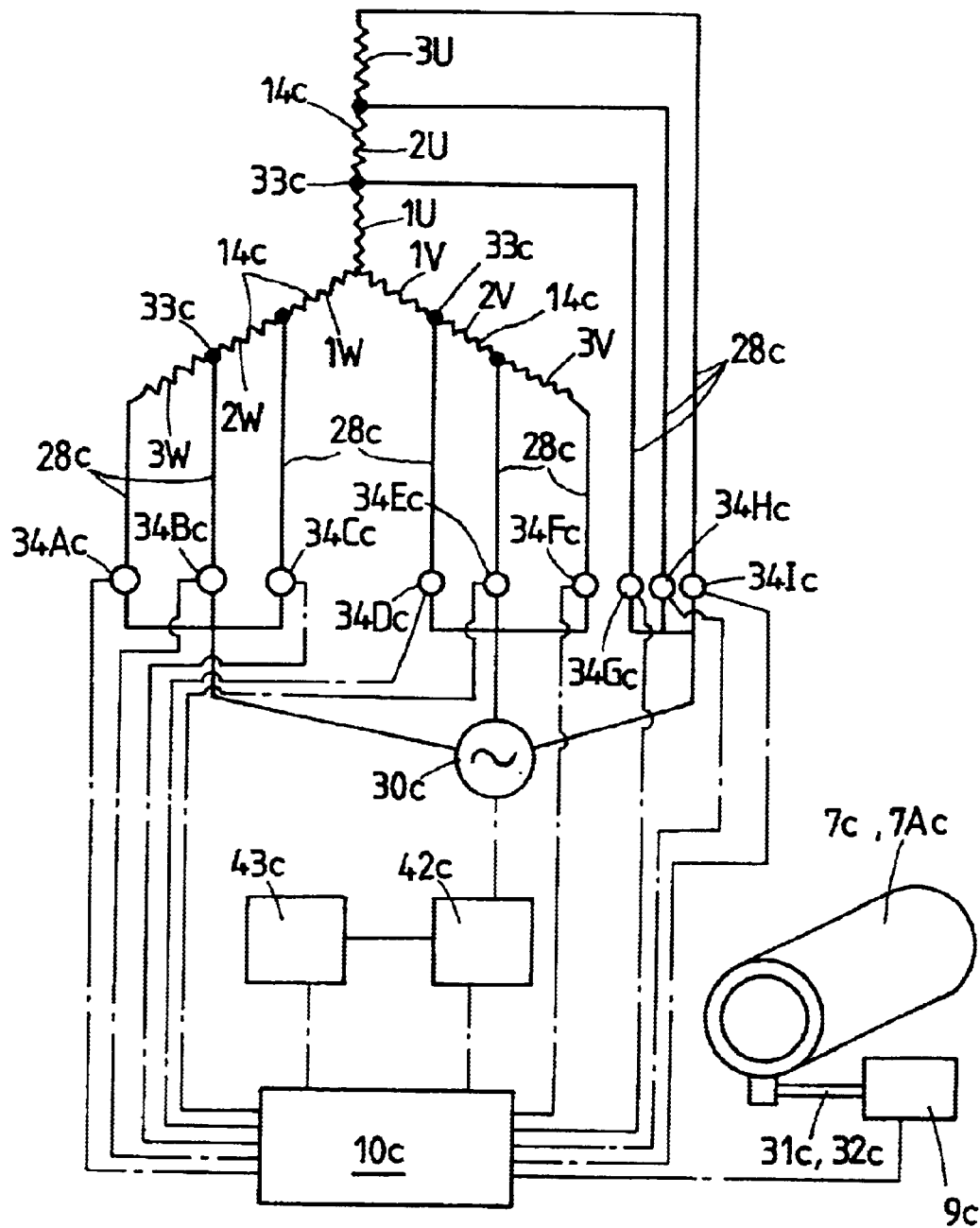
FIG. 29 is a wiring diagram showing an example of the winding connection of three-phase a-c system in the motor-generator.

The windings 14c to create a three-phase current are wired, for example as shown in FIG. 29, where subdivided windings 1U, 2U and 3U, subdivided windings 1V, 2V and 3V, and subdivided windings 1W, 2W and 3W are respectively connected in series at the connection points 33a that are connected through lines 28c to switches 34c (34Ac, 34Bc, 34Cc, 34Dc, 34Ec and 34Fc, 34Gc, 34Hc, 34Ic). Thus, the controller 10c in response to the rpm of the rotor 3c, controls the angular position of the annular member 7c, 7Ac relative to the stator 4c, and further controls the on-off operation of the switches 34c to connect more than one winding set either in parallel or in series with each other and further control, thereby giving a three-phase a-c power supply 30c of a desired alternating-voltage.

Figure 30:
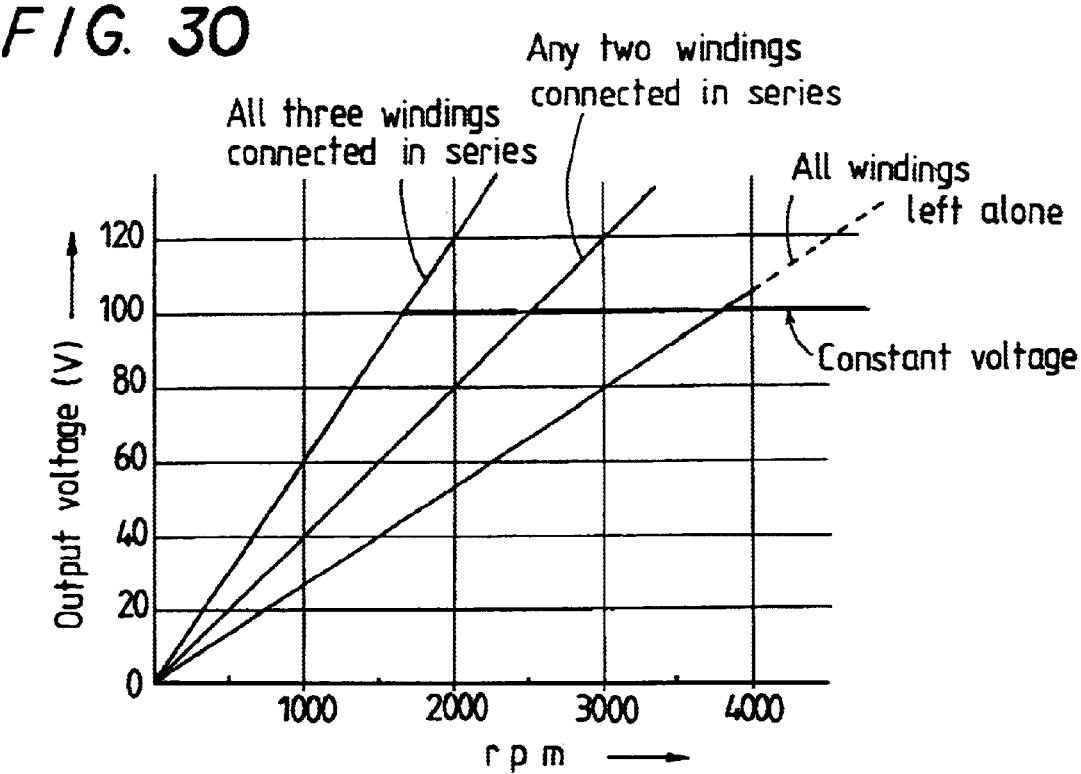
FIG. 30 is a graphic representation showing rpm vs. output voltage produced by the winding connection of the three-phase a-c system.
Figure 31:
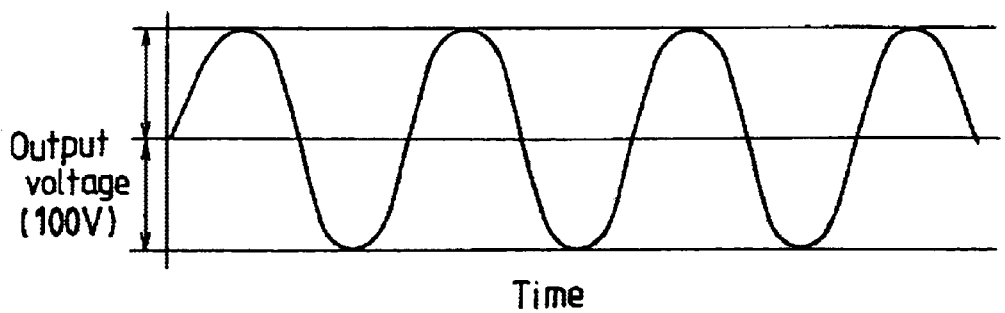
FIG. 31 is a graphic representation explaining an output voltage of alternating current changing with time.

For example, when the controller 10c turns on the switch 34Cc, switch 34Dc and switch 34Gc while turns off the residual switches, all winding sets are left unconnected from each other thereby giving the corresponding output voltage shown in FIG. 30. When the switch 34Bc, switch 34Ec and switch 34Hc are turned on while other switches are turned off, any two winding sets come into series connection, thus producing another corresponding voltage in FIG. 30. Moreover, when the controller 10c turns on the switch 34Ac, the switch 34Fc and the switch 34Ic while turns off the residual switches, all windings are connected in series, thereby producing another corresponding voltage in FIG. 30. Accordingly, the controller 10c governs the on-off operation of the switching means 34c in accordance with the rpm of the rotor 3c, thereby yielding the output voltage (V) of the constant alternating-voltage as shown in FIG. 30. Moreover, the windings 14c on the stator 4c are constituted in phase in matching with the number of poles of permanent magnets on the rotor 3c, while the winding sets 1U-1V-1W, 2U-2V-2W and 3U-3V-3W are connected in parallel, thereby providing the generator capable of producing a large current with even low voltage.

Figure 24:
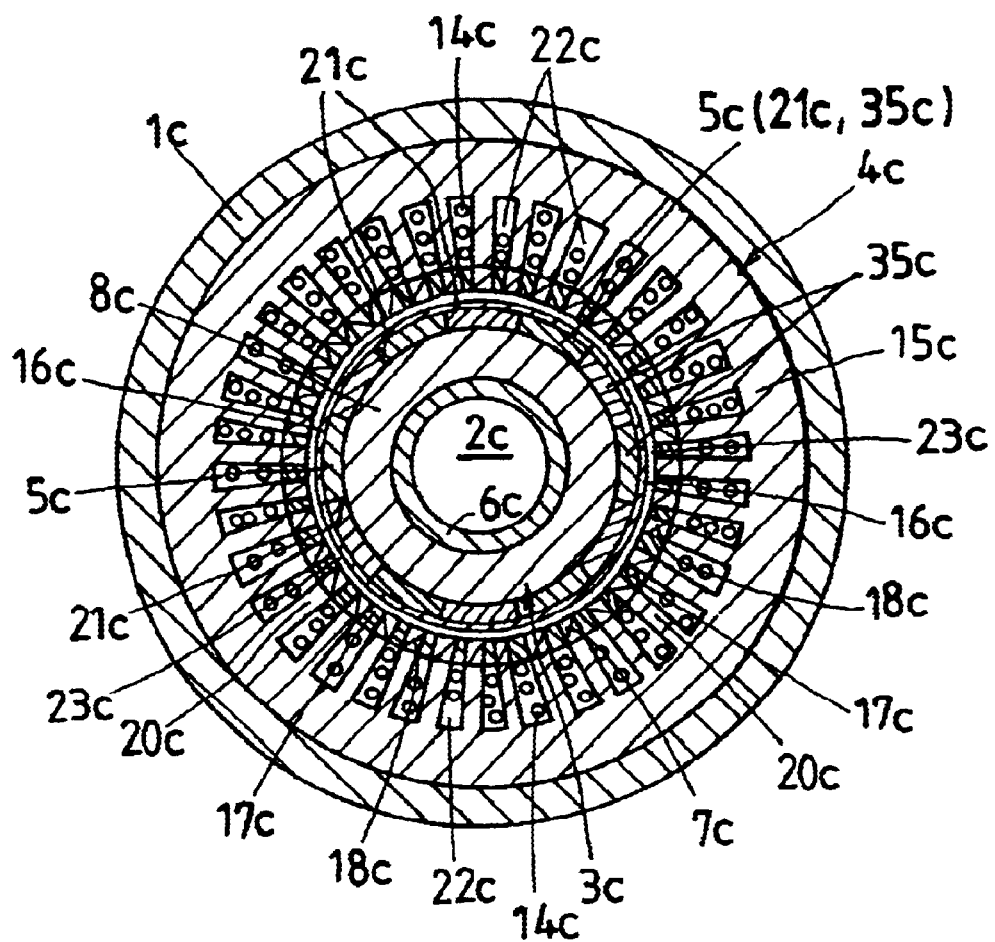
FIG. 24 is a cross-sectional view of the magnetic flux control means of FIG. 22 taken on the plane IV—IV of that figure, wherein an annular member is moved to an angular position where the magnetic flux is restricted.

With magnetic flux control means according to the fourth embodiment constructed as stated earlier, in which the annular member 7c is moved circumferentially by means of the actuator 9c energized in accordance with instructions issued out of the controller 10c, the annular member 7c is allowed to move in increments into any of more than one angular positions; a first position where any magnetic flux permeable chip 17c of the annular member 7c comes in alignment with any slot 22c in the stator core 15 on their centers of circumferential width and a second position where any magnetic flux permeable chips 17c of the annular member 7c comes in alignment with any tooth 20 in the stator core 15a. Whenever the annular member 7c come into the position as shown in FIG. 23, where any magnetic flux permeable chip 17c of the annular member 7c is placed in alignment with any tooth 20c in the stator core 15c while any nonmagnetic chip 18c of the annular member 7c comes into alignment with any slot 22c in the stator core 15c, the magnetic force coming from the permanent-magnet member 5c passes through the magnetic flux permeable chips 17c of the annular member 7c and then the teeth 20c in the stator core 15c to drive the rotor 3c. As opposed to the above, whenever annular member 7c comes into the position as shown in FIG. 24, where any magnetic flux permeable chips 17c of the annular member 7c is placed between any two adjacent teeth 20c in the stator core 15, with bridging any clearance between the two adjacent teeth 20c, the magnetic flux coming from the permanent-magnet member 5c is restricted.

Both the magnetic flux permeable chip 17c and the nonmagnetic piece 18c of the annular member 7c may be determined in their circumferential size with respect to the clearance between any adjacent teeth 20c in the stator core 15c, for example in such a relation that the magnetic flux coming from the permanent-magnet member 5c and entering the teeth 20c in the stator core 15c through the nonmagnetic chips 18c of the annular member 7c is almost equivalent in flux density with the magnetic flux coming from the permanent-magnet member 5c and entering the teeth 20c in the stator core 15c through the magnetic flux permeable chips 18c. Thus, when the actuator 9c moves the annular member 7c relatively to the stator core 15c into any angular position where any magnetic flux permeable chip 17c of the annular member 7c bridges across any clearance between any two adjacent teeth 20c in the stator core 15c, the magnetic force coming from the permanent-magnet member 5c and entering the teeth 20c through the magnetic flux permeable chips 17c of the annular member 7c is allowed to shift circumferentially with uniformity.

Once the rotor 3c is running, the annular member 7c is kept in the position where any magnetic flux permeable chip 17c of the annular member 7c comes into opposition to any associated tooth 20c in the stator core 15c as seen from FIG. 23. In contrast, when the rotor 3c comes to rest, any magnetic flux permeable chip 17c of the annular member 7c is placed bridging across any associated clearance between any adjacent teeth 20c in the stator core 15c, as shown in FIG. 24, so that the magnetic flux coming from the permanent-magnet member 5c and entering the teeth 20c in the stator core 15c is restricted to pass circumferentially of the annular member 7c with uniform distribution.

The permanent-magnet member 5c is formed in overall cylindrical configuration, and composed of more than one permanent-magnet piece 35c arranged circumferentially in juxtaposition and nonmagnetic piece 21c of vitreous material each interposed between any two adjacent permanent-magnet pieces 35c. The permanent-magnet piece 35c is of a radially directed magnet in which any one of unlike poles; N-and S-poles is radially inside the rotor 3c and another pole is outside the rotor 3c. Moreover, it is to be noted that the radially directed permanent-magnet pieces 35c are arranged in such a way that poles on either piece alternate in polarity (north, south, north, south) circularly around the rotor 3. The reinforcing member 16c may be made of, for example carbon fibers or ceramics fibers having no magnetism, which are molded with resinous material. As an alternative, the reinforcing member 16c may be made of either reinforcing filaments of ceramics and/or alloys or reinforcing cylinders of amorphous alloys, which are coated with vitreous material then, followed by winding around the outside periphery of the permanent-magnet member 5c at any elevated temperature to joint together the reinforcing filaments or cylinders with vitreous material.

What is claimed is:

1. A magnetic flux control means for a permanent-magnet motor-generator, comprising a rotor supported for rotation in a stator housing and composed of more than one permanent-magnet piece arranged circumferentially in a way spaced apart from each other, a stator fixed to the stator housing to surround around an outside periphery of the rotor and composed of a stator core with teeth providing sequential slots, and windings laid in the slots, an annular member arranged in close contact with the stator for angular movement with keeping sliding contact with the stator, a driving means to move the annular member with respect to the stator, and a controller for energizing the driving means in response to revolutions per minute of the rotor to control a position of the annular member relatively to the stator, thereby regulating a magnetic flux density in the teeth of the stator to give a predetermined voltage.

2. A magnetic flux control means for a motor-generator constructed as defined in claim 1, wherein the annular member is arranged inside the stator and comprised of a magnetic permeable piece less in width than the slot defined between any two adjacent teeth in the stator core, and a nonmagnetic piece interposed between any two adjacent magnetic permeable pieces, and wherein the windings laid in the stator are composed of a high-tension winding of more than one winding set for a power source, a low-tension winding of more than one winding set and a voltage-variable winding of at least one winding set for voltage control while the controller serves for controlling on-off operation of a switching means to change over connections among the winding sets, thereby varying a number of turns of the high-tension winding and the low-tension winding.

3. A magnetic flux control means constructed as defined in claim 2, wherein the controller operates the switching means depending on the revolutions per minute of the rotor to either connect in any of series and parallel or leave unconnected the high-tension winding and the low-tension winding, thereby giving any predetermined constant voltage.

4. A magnetic flux control means constructed as defined in claim 2, wherein the controller energizes the driving means to move circumferentially the annular member between an angular position where any clearance between any magnetic permeable piece in the annular member and the opposing tooth in the stator is made reduced so that the magnetic flux is unrestricted and another angular position where the clearance is made large so as to restrict the magnetic flux to thereby lower an output voltage.

5. A magnetic flux control means constructed as defined in claim 2, wherein the controller at low speed of the rotor energizes the switching means to connect in series the windings sets of the high-tension winding, thereby increasing the number of turns of the high-tension winding, whereas at high speed of the rotor gets the switching means to leave unconnected the winding sets of the high-tension winding from each other, and further when the revolutions per minute of the rotor starts to exceed a predetermined revolutions per minute, the controller operates the driving means to move circumferentially the annular member, whereby the high-tension winding produces a predetermine constant voltage.

6. A magnetic flux control means constructed as defined in claim 2, wherein the controller at low speed of the rotor energizes the switching means to connect in series the windings sets of the low-tension winding, whereas at high speed of the rotor gets the switching means to connect the winding sets of the low-tension winding in a way to reduce the number of turns, and further when the revolution per minute of the rotor starts to exceed a predetermined revolutions per minute, the controller operates the switching means to either connect in parallel or leave unconnected the winding sets and also energize the driving means to move circumferentially the annular member, whereby the low-tension winding produces a predetermined constant direct-voltage.

7. A magnetic flux control means constructed as defined in claim 2, wherein the controller carries out connection control of the winding sets of the low-tension winding in a way corresponding to a signal for connection control of the winding sets of the high-tension winding.

8. A magnetic flux control means constructed as defined in claim 2, wherein a voltage created in the voltage-variable winding is rectified to a variable direct voltage.

9. A magnetic flux control means constructed as defined in claim 1, wherein the annular member is comprised of magnetic permeable pieces each of which is formed in a rectangular shape in cross section having a width less than that of the slot between any two adjacent teeth in the stator, the magnetic permeable pieces being arranged in juxtaposition along an inside periphery of the stator with nonmagnetic pieces being each interposed between any two magnetic permeable pieces, and the magnetic permeable pieces are each chamfered off at corners on a radially outside circumference of the rectangular shape in cross section to provide first chamfered areas, so that when any magnetic permeable piece is placed in opposition to any slot in the stator, first clearances of preselected amount are left between the first chamfered areas and widthwise opposing corners of the associated teeth on a radially inside circumference of the stator.

10. A magnetic flux control means constructed as defined in claim 9, wherein the tooth in the stator is chamfered off at its tooth tip corners to provide second chamfers so that the first clearances are formed in magnetic path clearances defined between the first and second chamfered areas.

11. A magnetic flux control means constructed as defined in claim 9, wherein a second clearance of preselected amount is provided between the inside periphery of the annular member and an outside periphery of the rotor.

12. A magnetic flux control means constructed as defined in claim 9, wherein the windings are wound on the teeth of the stator core in the stator so as to generate electricity in phase, and also grouped into more than one winding set to be connected in series to provide the turns different in number, while the controller serves for regulating angular position of the annular member with respect to the stator and further for connecting in one configuration of series and parallel the winding sets, depending on the revolution per minute of the rotor, thereby giving a predetermined voltage.

13. A magnetic flux control means constructed as defined in claim 1, wherein the annular member is arranged around an outside periphery of the stator and has magnetic flux control grooves cut into an inner peripheral surface thereof, with remaining ribs between the grooves, which are extended axially of the stator and spaced apart away from each other at regular intervals around the curved inner surface, so that the sequential ribs between the slots form at their inside tips a curved surface that comes into close sliding contact with the outside periphery of the stator.

14. A magnetic flux control means constructed as defined in claim 13, wherein the grooves inside the annular member are each made roughly equivalent in a circumferential length with any one tooth in the stator.

15. A magnetic flux control means constructed as defined in claim 13, wherein an outside peripheral path for magnetic flux in the stator core is made less in width by a width of a magnetic path in the annular member.

16. A magnetic flux control means constructed as defined in claim 13, wherein the magnetic flux passing through any tooth in the stator core is restricted when any groove in the annular member comes into radial alignment with the tooth, whereas the magnetic flux passing through any tooth in the stator core remains unrestricted when any rib in the annular member comes into radial alignment with the tooth.

17. A magnetic flux control means constructed as defined in claim 13, wherein the grooves in the annular member are charged with nonmagnetic solid lubricant to reduce a frictional resistance that is encountered when the annular member slides over the stator core.

18. A magnetic flux control means constructed as defined in claim 13, wherein the slots in the stator are charged with resinous strengthening material to improve stiffness of the stator.

19. A magnetic flux control means constructed as defined in claim 13, wherein the annular member is composed of a pair of annular halves, which are arranged so as to move circumferentially in directions opposite to each other by the action of the driving means.

20. A magnetic flux control means constructed as defined in claim 13, wherein the driving means is a reversible motor that has a reversible rotary shaft around which a clockwise thread and a counterclockwise thread are formed, while on the annular halves there are fixed nuts that have threads, each to each nut, mating the threads around the rotary shaft, respectively.

21. A magnetic flux control means constructed as defined in claim 13, wherein the windings are wound on the teeth of the stator core in the stator and also grouped into more than one winding set different from each other in a number of turns, while the controller in response to the revolutions per minute of the rotor serves to control an angular position of the annular member with respect to the stator and further to make at least any one of series and parallel connections of the winding sets, thereby giving a predetermined voltage.

22. A magnetic flux control means constructed as defined in claim 21, wherein the controller, when the motor-generator operates as generator, connects the winding sets in series in response to a low revolutions per minute of the rotor to produce a high voltage, while connects any winding sets in parallel in response to a high revolutions per minute of the rotor to produce a large current with even desired voltage.

23. A magnetic flux control means constructed as defined in claim 21, wherein the controller, when the motor-generator operates as motor, connects the winding sets in series in response to a low rpm of the rotor to produce a high magnetic force, while connects any winding sets in parallel in response to a high revolutions per minute of the rotor to reduce the number of turns to provide a predetermined magnetic force.

24. A magnetic flux control means constructed as defined in claim 21, wherein with the windings shunt-wound in the stator core, conductors of the windings so wound as to become identical in phase are connected in series at a low revolutions per minute range and are led out on the way to reduce the number of turns as the revolutions per minute of the rotor increases, while the circumferentially shunt-wound windings are either connected in parallel or left unconnected with each other at a high revolutions per minute of the rotor to thereby allow, with being coupled with the angular position control of the annular member 7b, to give one of a constant voltage and a constant torque.

25. A magnetic flux control means constructed as defined in claim 21, wherein the windings on the stator are constituted in phase in matching with a number of poles of permanent magnets on the rotor, while the winding sets are connected in parallel, thereby providing the generator capable of producing a large current with even the predetermined voltage.

26. A magnetic flux control means constructed as defined in claim 1, wherein the annular member is arranged inside the stator and is comprised of density-rich magnetic permeable parts in which magnetic permeable materials are densely laminated in the form of a circle, and density-lean magnetic permeable parts in which magnetic permeable chips are arranged circularly in a manner spaced apart from each other at an interval of circumferential length equivalent to a circumferential width of the tooth and nonmagnetic chips are each arranged in a space left open between any two adjacent magnetic permeable chips, the nonmagnetic chips being made of nonmagnetic reinforcing material, and the density-rich and density-lean magnetic permeable parts unlike in density being arranged alternately along the axial direction.

27. A magnetic flux control means constructed as defined in claim 26, wherein the magnetic permeable chips are arranged circularly in such a way to leave a space open between any two adjacent magnetic permeable chips, the space being equal in number to the teeth and provided at an interval of length equivalent to a circumferential width of the tooth in the stator.

28. A magnetic flux control means constructed as defined in claim 26, wherein the density-rich magnetic permeable parts and the magnetic permeable chips are made of circular magnetic permeable plates laminated densely at an equal interval.

29. A magnetic flux control means constructed as defined in claim 26, wherein the density-lean parts of the annular member are each composed of annular magnetic permeable steel plates overlaid axially one on the other, the annular magnetic permeable steel plate being made of arched density-lean chips and density-rich chips, which are arranged in the form of cylinder in a manner spaced apart at an equal interval, and windows left open between chips unlike in density are filled with the nonmagnetic reinforcing material.

30. A magnetic flux control means constructed as defined in claim 26, wherein the density-rich parts of the annular member are each made of an axial lamination of a magnetic permeable ring and a silicon-steel plate, which are jointed together.

31. A magnetic flux control means constructed as defined in claim 26, wherein a hollow cylinder of thin silicon steel plate is press-fit inside an inner surface of the teeth in the stator.

32. A magnetic flux control means constructed as defined in claim 26, wherein the annular member is provided at axially opposing ends thereof with outer rings, each to each end, to keep the magnetic force against leaking out from the axially opposing ends, the outer rings being made of a silicon steel plate superior in permeability.

33. A magnetic flux control means constructed as defined in claim 26, wherein the annular member is arranged inside the stator, with an outside periphery thereof being kept in close contact with an inner tips of the teeth in the stator for sliding movement, and the driving means includes any axial end of the annular member, to which is applied a rotating force for moving circumferentially the annular member, a rod transmitting the rotating force to the axial end, and an actuator to move in and out the rod.

34. A magnetic flux control means constructed as defined in claim 26, wherein the windings are wound on the teeth of the stator core in the stator so as to generate electricity in phase and also grouped into more than one winding set to be connected in series to provide the turns different in number, while the controller serves for regulating angular position of the annular member with respect to the stator and further for making at least any one of series and parallel connections among the winding sets, depending on the revolutions per minute of the rotor, thereby giving a predetermined voltage.

35. A magnetic flux control means constructed as defined in any one of claims 2, 9 and 26. wherein the nonmagnetic piece is replaced with any one of air, a reinforcing member of aluminum and resinous material.

36. A magnetic flux control means constructed as defined in any one of claims 2, 9 and 26, wherein the annular member is made of an axial lamination of more than one ring member in which the magnetic permeable piece and the nonmagnetic piece are overlaid one on the other.

37. A magnetic flux control means constructed as defined in any one of claims 2, 9 and 26, wherein the driving means is composed of any axial end of the annular member, to which is applied a rotating force for moving circumferentially the annular member, a rod transmitting the rotating force to the axial end, and an actuator to move in an out the rod.

38. A magnetic flux control means constructed as defined in any one of claims 2, 9 and 26, wherein the driving means includes a d-c motor and the controller selects more than one position of the rod sensed by a position sensor and energizes the driving means to move in and out the rod.

39. A magnetic flux control means constructed as defined in any one of claims 2, 9 and 26, wherein the driving means includes a solenoid-operated valve having a rod connected to any one axial end of the annular member, while the controller selects more than one position of the rod sensed by a position sensor and transforms a load voltage applied to the solenoid-operated valve, moving the rod to rotate the annular member.

40. A magnetic flux control means constructed as defined in any one of claims 2, 9, 13 and 26, wherein the controller has an inverter function that rectifies an electric current produced at a predetermined voltage to output an alternating-voltage of a preselected constant voltage.

* * * * *